US012506616B2

(12) United States Patent
Liu et al.

(10) Patent No.: US 12,506,616 B2
(45) Date of Patent: Dec. 23, 2025

(54) BLOCK-CHAIN-BASED DATA PROCESSING METHOD, COMPUTER DEVICE, COMPUTER-READABLE STORAGE MEDIUM

(71) Applicant: TENCENT TECHNOLOGY (SHENZHEN) COMPANY LIMITED, Shenzhen (CN)

(72) Inventors: Qucheng Liu, Shenzhen (CN); Zongyou Wang, Shenzhen (CN); Hu Lan, Shenzhen (CN); Gengliang Zhu, Shenzhen (CN); Pan Liu, Shenzhen (CN); Kaiban Zhou, Shenzhen (CN); Yifang Shi, Shenzhen (CN); Zhiyong Liao, Shenzhen (CN); Huankun Huang, Shenzhen (CN); Jinsong Zhang, Shenzhen (CN); Hanqing Liu, Shenzhen (CN); Yingjie Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 229 days.

(21) Appl. No.: 18/354,962

(22) Filed: Jul. 19, 2023

(65) Prior Publication Data
US 2023/0370285 A1 Nov. 16, 2023

Related U.S. Application Data

(63) Continuation of application No. PCT/CN2022/108638, filed on Jul. 28, 2022.

(30) Foreign Application Priority Data

Aug. 18, 2021 (CN) .......................... 202110947014.4

(51) Int. Cl.
*H04L 9/32* (2006.01)
*G06F 16/27* (2019.01)
*H04L 9/00* (2022.01)

(52) U.S. Cl.
CPC ............ *H04L 9/3247* (2013.01); *G06F 16/27* (2019.01); *H04L 9/50* (2022.05)

(58) Field of Classification Search
CPC .......... G06F 16/27; H04L 9/3247; H04L 9/50
See application file for complete search history.

(56) References Cited

U.S. PATENT DOCUMENTS

2020/0387395 A1 12/2020 Viale et al.
2021/0049601 A1* 2/2021 Yang .................... G06Q 20/401
(Continued)

FOREIGN PATENT DOCUMENTS

CN 109150598 A 1/2019
CN 111062811 A 4/2020
(Continued)

OTHER PUBLICATIONS

The World Intellectual Property Organization (WIPO) International Search Report for PCT/CN2022/108638 Oct. 19, 2022 7 Pages (including translation).

*Primary Examiner* — Olugbenga O Idowu
(74) *Attorney, Agent, or Firm* — Anova Law Group, PLLC

(57) ABSTRACT

Block-chain-based data processing method includes acquiring, by a transaction processing node, transaction data for validation, and performing validation processing on the transaction data to obtain a validation processing result; in response to the validation processing result of the transaction data for validation being a validated-as-valid result, adding the transaction data to a transaction pool; in response to a transaction packing request transmitted by a block processing node being received, acquiring at least one
(Continued)

transaction data from the transaction pool according to the transaction packing request, hardware device resources of the transaction processing node and the block processing node being independent from each other; and performing packing processing on the at least one transaction data to obtain a transaction data packet, and transmitting the transaction data packet to the block processing node to generate a proposed block according to the at least one transaction data in the transaction data packet.

20 Claims, 19 Drawing Sheets

(56) References Cited

U.S. PATENT DOCUMENTS

| | | | |
|---|---|---|---|
| 2021/0089422 A1* | 3/2021 | Kim | G06F 11/3079 |
| 2021/0160082 A1 | 5/2021 | Wang | |
| 2023/0370285 A1 | 11/2023 | Liu et al. | |

FOREIGN PATENT DOCUMENTS

| | | |
|---|---|---|
| CN | 112287033 A | 1/2021 |
| CN | 113179324 A | 7/2021 |
| CN | 113409047 A | 9/2021 |
| WO | 2020082887 A1 | 4/2020 |

* cited by examiner

BLOCK-CHAIN-BASED DATA PROCESSING METHOD, COMPUTER DEVICE, COMPUTER-READABLE STORAGE MEDIUM

RELATED APPLICATIONS

The present disclosure is a continuation application of PCT Patent Application No. PCT/CN2022/108638, filed on Jul. 28, 2022, which claims priority to Chinese Patent Application No. 202110947014.4, filed on Aug. 18, 2021, all of which are incorporated herein by reference in their entirety.

FIELD OF THE TECHNOLOGY

The present disclosure relates to the field of computer technologies, and in particular to a block-chain-based data processing method and apparatus, a computer device, a computer-readable storage medium and a computer program product.

BACKGROUND OF THE DISCLOSURE

Block chain is a new application mode of distributed data storage, peer-to-peer transmission, consensus mechanism, encryption algorithm and other computer technologies. It is mainly used for sorting data in chronological order and encrypting into a ledger, so that it cannot be tampered with and forged, and at the same time, it can realize data validation, storage and updating. Block chain can also realize data encryption transmission, node identification and secure access, which is an advanced distributed infrastructure. At present, due to the tamper-proof performance and authenticity of block chain, there are more and more applications for block chain.

At present, in a block chain network built by some popular block chain protocols, all functions required for transaction chaining are usually completed through core nodes, namely, full nodes, such as transaction broadcasting, transaction signature validation, transaction duplicate validation, block packing, block consensus, transaction execution, and storage in ledgers. However, some functions in the block chain need to use the same resources including, for example Central Processing Unit (CPU) and hard disk input/output (IO). Therefore, for some large block chain projects, such as tax block chain, because of the large service processing volume and intensive service processing, the block chain network needs to perform block-chaining of thousands of transactions within the same time period, different transactions currently require different functions, and functions required by a large number of transactions are in parallel currently, so that CPU, IO and other resources of the full nodes are frequently preempted, resulting in a large amount of system scheduling. Consequently, the node cannot return the service processing result to the terminal in time, resulting in significant delay in service processing.

SUMMARY

Embodiments of the present disclosure provide a block-chain-based data processing method and apparatus, a computer device, a non-transitory computer-readable storage medium and a computer program product, which can improve the processing efficiency of the system scheduling of the block chain network and improve the speed of service processing.

One aspect of the present disclosure provides a block-chain-based data processing method executed by a transaction processing node that includes at least one computer device. The method includes acquiring, by the transaction processing node, transaction data for validation, and performing validation processing on the transaction data for validation to obtain a validation processing result of the transaction data for validation; in response to the validation processing result of the transaction data for validation being a validated-as-valid result, adding the transaction data for validation to a transaction pool; in response to a transaction packing request transmitted by a block processing node being received, acquiring at least one transaction data from the transaction pool according to the transaction packing request, hardware device resources of the transaction processing node and the block processing node being independent from each other; and performing packing processing on the at least one transaction data to obtain a transaction data packet, and transmitting the transaction data packet to the block processing node for the block processing node to generate a proposed block according to the at least one transaction data in the transaction data packet.

Another aspect of the present disclosure provides a computer device in a transaction processing node. The computer device includes a processor, a memory and a network interface, the processor being connected to the memory and the network interface, the network interface being configured to provide a data communication function, the memory being configured to store a program code, and the processor being configured to call the program code to execute a block-chain-based data processing method. The method includes acquiring transaction data for validation, and performing validation processing on the transaction data for validation to obtain a validation processing result of the transaction data for validation; in response to the validation processing result of the transaction data for validation being a validated-as-valid result, adding the transaction data for validation to a transaction pool; in response to a transaction packing request transmitted by a block processing node being received, acquiring at least one transaction data from the transaction pool according to the transaction packing request, hardware device resources of the transaction processing node and the block processing node being independent from each other; and performing packing processing on the at least one transaction data to obtain a transaction data packet, and transmitting the transaction data packet to the block processing node for the block processing node to generate a proposed block according to the at least one transaction data in the transaction data packet.

Another aspect of the present disclosure provides a non-transitory computer-readable storage medium storing a computer program, the computer program being adapted to be loaded and executed by a processor of a transaction processing node to execute a block-chain-based data processing method. The method includes acquiring transaction data for validation, and performing validation processing on the transaction data for validation to obtain a validation processing result of the transaction data for validation; in response to the validation processing result of the transaction data for validation being a validated-as-valid result, adding the transaction data for validation to a transaction pool; in response to a transaction packing request transmitted by a block processing node being received, acquiring at least one transaction data from the transaction pool according to the transaction packing request, hardware device resources of the transaction processing node and the block processing node being independent from each other; and performing packing processing on the at least one transaction data to obtain a transaction data packet, and transmitting the transaction data packet to the block processing node for the block processing node to generate a proposed block according to the at least one transaction data in the transaction data packet.

As disclosed, transaction validation, transaction broadcasting and other operations are allocated to the transaction processing node to complete, and block packing, block consensus, transaction execution, storage in ledgers and other operations are allocated to the block processing node to complete, which is equivalent to dividing the functions of the block chain according to the hardware resource requirements required by each function, thus allocating some different functions to different hardware resources through the transaction processing node and the block processing node, preventing some functions from preempting the hardware resources, not requiring the full node to support all the functions required for the transaction chaining, reducing the system scheduling consumption caused by over-reliance on the functions of the full node, improving the data processing efficiency of the block chain network aiming at user service, and returning the service processing result to the user in time.

BRIEF DESCRIPTION OF THE DRAWINGS

In order to more clearly describe the embodiments of the present disclosure or the technical solutions in the existing technologies, the following will briefly introduce the drawings needed in the description of the embodiments or the existing technologies. The drawings in the following description are only some embodiments of the present disclosure. Those skilled in the art may obtain other drawings from these drawings without contributing any inventive labor.

DESCRIPTION OF EMBODIMENTS

Figure 1:
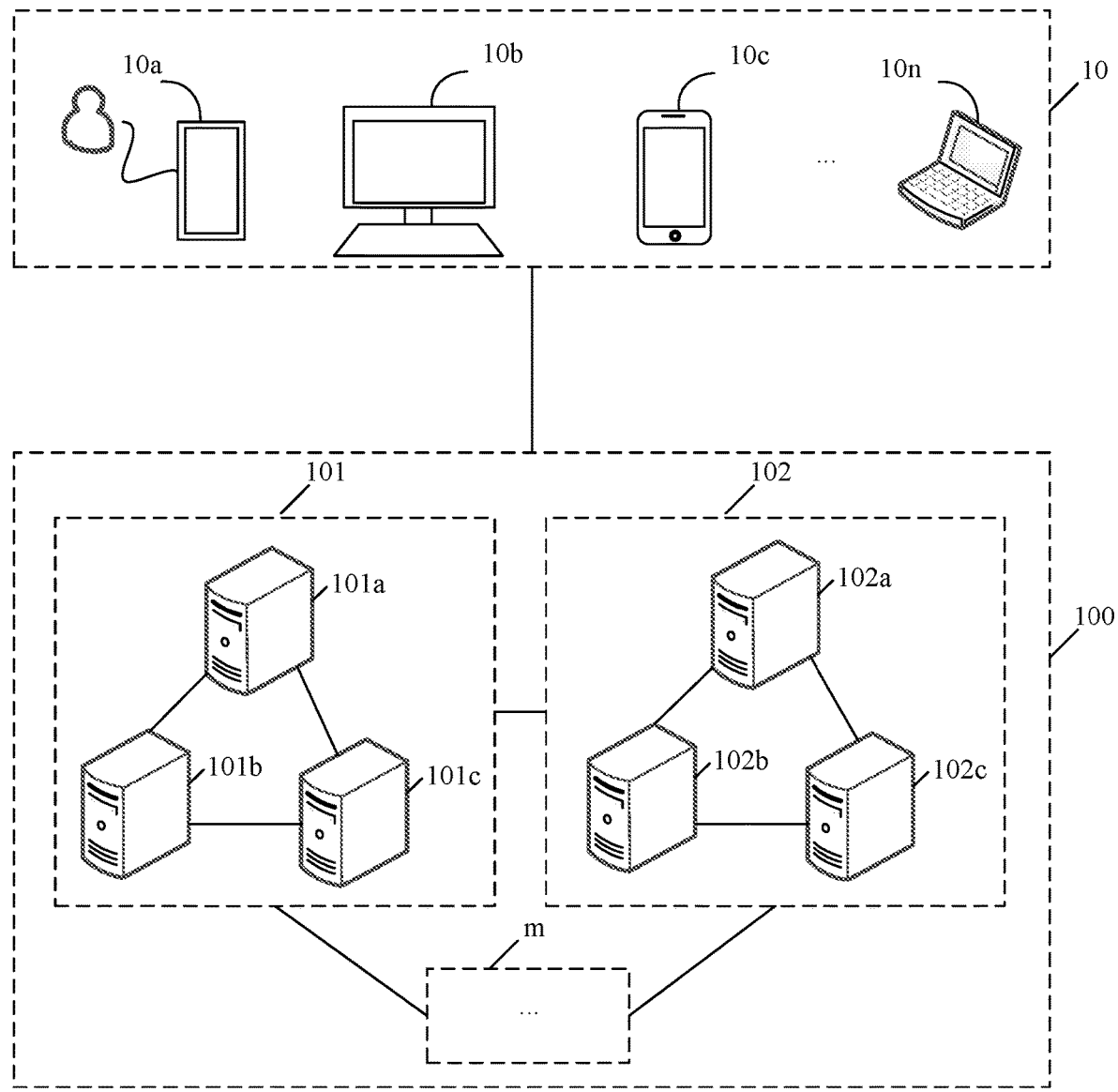
FIG. 1 is a schematic structural diagram of a network architecture according to an embodiment of the present disclosure.

The technical solutions in the embodiments of the present disclosure will be clearly and completely described in the following with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without making creative efforts shall fall within the scope of protection of the present disclosure.

Before the embodiments of the present disclosure are further described in detail, a description is made on terms in the embodiments of the present disclosure, and the terms in the embodiments of the present disclosure are applicable to the following explanations.

1) Block chain: block chain is a chained data structure in a basic unit of block. In blocks, digital digests are used for validating previously acquired transaction history, which is suitable for tamper-proof and scalability requirements in distributed bookkeeping scenarios. Block chain also refers to a distributed bookkeeping technology realized by a block chain structure, including distributed consensus, privacy and security protection, peer-to-peer communication technology, network protocol, smart contract, etc. The goal of block chain is to achieve a distributed data record ledger, which allows addition only and does not allow deletion. The basic structure of the bottom layer of the ledger is a linear linked list. The linked list includes "blocks" in series. The hash of the predecessor block is recorded in the subsequent block. Whether each block (and the transaction in the block) is valid can be quickly validated by calculating the hash. If a block chain node in the block chain network proposes to add a new block, it is necessary to confirm the block by consensus through a consensus mechanism.

2) Block: block is a data packet that carries transaction data (i.e., transaction service) on the block chain network and is a data structure marked with a timestamp and the hash corresponding to the previous block. The transaction in the block is validated and determined through the consensus mechanism of the network.

3) Hash: it is also known as information eigenvalue or eigenvalue. Hash is generated by converting input data of any length into a password through a hash algorithm and performing fixed output. The original input data cannot be retrieved by decrypting the hash. It is a one-way encryption function. In the block chain, each block (except the initial block) contains the hash of the predecessor block, which is called the parent block of the current block. The hash is the core foundation and the most important aspect of the potential of the block chain technology. It preserves the authenticity of the recorded and viewed data and the integrity of the block chain as a whole.

4) Consensus: it is a process in the block chain network and is used for reaching an agreement on the transaction in the block between a plurality of nodes involved. The agreed block will be added to the end of the block chain. The mechanism for achieving consensus includes Proof of Work (PoW), Proof of Stake (PoS), Delegated Proof-of-Stake (DPoS), Proof of Elapsed Time (PoET), etc.

5) Transaction: it is equivalent to the computer term transaction according to various embodiments. Transactions may include the operations that need to be submitted to the block chain network for execution and the corresponding transaction results. It does not refer to transactions in the commercial context alone. In view of the customary use of the term "transaction" in block chain technology, the embodiments of the present disclosure follow this habit. For example, transactions may include deploy transactions and invoke transactions. Deploy transactions are used for putting smart contracts into nodes in the block chain network and prepare to be invoked. Invoke transactions are used for performing query operations (i.e., reading operations) or updating operations (i.e., writing operations, including addition, deletion and modification) on the status database in the ledger.

The block chain network includes many block chain nodes. Users interact with the block chain through decentralized applications (DApp), that is, users can transmit transaction data (service requests) corresponding to transactions to the block chain through DApp. Generally, the life cycle of a transaction includes the following processing steps:

1. Transaction generation: a user inputs parameters through DApp, which packs them into transaction data and transmits the transaction data to a certain block chain node.

2. Transaction broadcasting: the block chain node broadcasts the received transaction data to the entire block chain network.

Transaction validation: after receiving the transaction data, the block chain node performs signature validation on the transaction data, and performs transaction duplicate validation from the ledger (DB). The transaction data that passes the validation enters the transaction pool.

Block packing: the proposer node picks up the transaction data from the transaction pool, packs it into the proposed block, and broadcasts it to the block chain network. The proposer node is a block chain node responsible for packing the proposed block in this round. The method of selecting the proposer node varies according to the consensus algorithm. The common ones include block proposal in turn and block proposal by computing power competition.

Block validation: after receiving the proposed block, the block chain nodes validate the transaction data therein. When the transaction is already in the transaction pool, the validation passes. Otherwise, signature validation and duplicate validation operations need to be performed on the transaction.

Block consensus: the block chain nodes perform voting on the received proposed block according to the block validation result. When the number of votes received by the block chain nodes is more than a number threshold, it represents that the consensus pass condition is met. After the consensus pass condition is met, the proposed block is recognized and submitted.

Transaction execution: it refers to executing the transaction data in the recognized proposed block.

Storage in ledger: it refers to storing the proposed block, transaction data and transaction execution result in the block chain ledger.

FIG. 1 is a schematic structural diagram of a network architecture according to an embodiment of the present disclosure. Referring to FIG. 1, the network architecture may include a terminal device (client) cluster 10 and a block chain node cluster 100. The block chain node cluster 100 may include at least two block chain nodes. Each block chain node includes at least one computer device. Referring to FIG. 1, the terminal device cluster 10 may specifically include a terminal device 10a, a terminal device 10b, a terminal device 10c, . . . , and a terminal device 10n. The block chain node cluster 100 may specifically include a block chain node 101, a block chain node 102, . . . , and a block chain node m. Each block chain node in the block chain node cluster 100 may include the following child nodes: a block chain gateway node, a transaction processing node and a block processing node. For example, the block chain node 101 may include a block chain gateway node 101a, a transaction processing node 101b and a block processing node 101c, and the block chain node 102 may include a block chain gateway node 102a, a transaction processing node 102b and a block processing node 102c. The block chain gateway node is mainly responsible for data forwarding between block chain nodes. The transaction processing node is mainly responsible for transaction broadcasting and transaction validation. The block processing node is mainly responsible for block packing, block consensus, transaction execution, and storage in the ledger.

The network architecture illustrated in FIG. 1 may be applied to a block chain network. The block chain network may include but not limited to a block chain network corresponding to an alliance chain. Within each block chain node, the block chain gateway node, the transaction processing node and the block processing node may have data connections between every two of them, so that the block chain gateway node, the transaction processing node and the block processing node can perform data interaction with each other and jointly realize the functions required for transaction chaining. For example, a data connection exists between the block chain gateway node 101a and the transaction processing node 101b, a data connection exists between the block chain gateway node 101a and the block processing node 101c, and a data connection exists between the transaction processing node 101b and the block processing node 101c. Each block chain node in the block chain node cluster 100 may receive data transmitted by any terminal device in the terminal device cluster 10 during normal operation, and perform block chaining processing based on the received data, or may transmit data to any terminal device in the terminal device cluster 10, that is, the terminal device 10a, the terminal device 10b, the terminal device 10c, . . . , the terminal device 10n may be respectively in data communication with the block chain node 101, the block chain node 102, . . . and the block chain node m, so that the terminal devices can perform data interaction with service nodes through the network connection. The data between the block chain nodes in the block chain node cluster 100 may be shared. In order to ensure the data intercommunication between the block chain nodes, data connections may exist between block chain nodes. For example, a data connection exists between the block chain node 101 and the block chain node 102, a data connection exists between the block chain node 101 and the block chain node m, and a data connection exists between the block chain node 102 and the block chain node m. Through the data connections, transaction data or proposed blocks can be transmitted.

As an example, when the block chain nodes in the block chain node cluster 100 perform data interaction with the outside world (such as other block chain nodes in the block chain node cluster 100 and any terminal device in the terminal device cluster 10), the data connection is usually performed through the respective block chain gateway node. In the block chain network corresponding to the block chain node cluster 100, the data connection between the block chain gateway nodes may be realized based on the node identity. Each block chain gateway node in the block chain network has its corresponding node identity, and each block chain gateway node may store the node identities of other block chain gateway nodes that are connected with itself, so that the acquired transaction data or proposed block can be subsequently broadcast to other block chain nodes according to the node identities of other block chain gateway nodes. For example, the block chain gateway node 101a may maintain a node identity list as shown in Table 1. This node identity list stores the node names and node identities of other block chain gateway nodes.

TABLE 1

| Node name | Node identity |
| --- | --- |
| Block chain gateway node 101a | 117.114.151.174 |
| Block chain gateway node 102a | 117.116.189.145 |
| . . . | . . . |

As an example, the node identity may be the Internet Protocol (IP) address of the interconnection between networks and any other information that can be used for identifying the block chain gateway nodes in the block chain network. In Table 1, description is made by taking the IP address only as an example. For example, the block chain gateway node 101a can transmit information (e.g., transaction data and proposed block) to the block chain gateway node 102a through the node identity 117.116.189.145, and the block chain gateway node 102a can determine that the information is transmitted by the block chain gateway node 101a through the node identity 117.114.151.174.

As an example, the data connection method is not limited. They may be directly or indirectly connected through wired communication, or directly or indirectly connected through wireless communication, or through other connection methods, which are not limited in the embodiment of the present disclosure.

As an example, the data processing method according to the embodiment of the present disclosure may be executed by a computer device. The computer device may be, but not limited to, the block chain gateway node, transaction processing node or block processing node (which may be a terminal device or server). Equivalently, the block chain gateway node, transaction processing node or block processing node may include at least one computer device. The server may be an independent physical server, a server cluster or a distributed system composed of a plurality of physical servers, or a cloud server that provides cloud services, cloud databases, cloud computing, cloud functions, cloud storage, network services, cloud communications, middleware services, domain name services, security services, CDN, and basic cloud computing servers for big data and artificial intelligence platforms. The terminal may be, but is not limited to, a smart phone, a tablet, a laptop, a desktop computer, a smart speaker, a smart watch or a car terminal. It is to be understood that hardware device resources between every two of the block chain gateway node, the transaction processing node and the block processing node are independent from each other.

Referring to FIG. 1, any terminal device in the terminal device cluster 10 may be integrated and installed with a target application. The target application may be a decentralized application. Assuming that the target application is running on the terminal device 10a, the terminal device 10a can generate transaction data through the target application and transmit the transaction data to the block chain gateway node of any block chain node in the block chain. For example, when it is transmitted to the block chain gateway node 101a of the block chain node 101, the block chain gateway node 101a will forward the received transaction data to the transaction processing node 101b of the block chain node 101. After acquiring the transaction data, the transaction processing node 101b will perform validation processing on the transaction data to obtain a validation processing result of the transaction data. When the validation processing result is a validated-as-valid result, the transaction data will be added to the transaction pool. The transaction pool is a temporary list for storing transaction data that the transaction processing nodes in the block chain network need to maintain. The transaction processing nodes use the transaction pool to temporarily store the transaction data known in the block chain network but not included in the block chain, that is, the transaction pool may store a plurality of transaction data validated as valid.

Referring back to FIG. 1, any block chain node in the block chain node cluster 100 may be used as a proposer node. In this case, the block processing node of the block chain node is responsible for the generation of a proposed block. Assuming that the block chain node 101 is a proposer node, the block processing node 101c may generate a transaction packing request, and then transmit the transaction request to the transaction processing node 101b. After receiving the transaction packing request, the transaction processing node 101b will extract at least one transaction data from the transaction pool according to the transaction packing request, then generate a transaction data packet, and return the transaction data packet to the block processing node 101c. After receiving the transaction data packet transmitted by the transaction processing node 101b, the block processing node 101c may generate a proposed block based on the at least one transaction data in the transaction data packet. Then, the block processing node 101c will perform consensus processing on the proposed block to obtain a consensus processing result. When the consensus processing result is a consensus pass result, the proposed partnership is executed to obtain a transaction execution result corresponding to the at least one transaction data, and the proposed block and the transaction execution result are written into a block chain ledger. The process that the block processing node 101c performs consensus processing on the proposed block to obtain a consensus processing result may be realized through the following technical solution: the block processing node 101c firstly performs signature processing on the proposed block to obtain block signature data; then, the block processing node 101c forwards the proposed block and the block signature data together to the block chain gateway node 101a; then, the block chain gateway node 101a broadcasts the proposed block and the block signature data to the block chain gateway nodes of the remaining block chain nodes in the block chain node cluster 100; then, the block chain gateway nodes of the remaining block chain nodes forward the proposed block and the block signature data to the block processing nodes of their respective block chain nodes; after receiving the proposed block and the block signature data, the remaining block processing nodes perform validation processing on the proposed block after the block signature data is successfully validated to obtain a first block validation result; the block processing node 101c also performs block validation processing on the proposed block to obtain a second block validation result; then, the block processing node 101c determines a consensus processing result aiming at the proposed block based on the first block validation result and the second block validation result.

As an example, there are many consensus methods. At the performance level, the consensus algorithm is divided into a strong consensus algorithm and a weak consensus algorithm from the perspective of data consistency, and the consensus algorithm is divided into a Byzantine fault-tolerant consensus algorithm and a non-Byzantine fault-tolerant consensus algorithm from the perspective of Byzantine fault-tolerance. At the application level, the consensus algorithm can be divided into a consensus algorithm applicable to public chains, alliance chains and private chains; starting from the consensus process, the consensus algorithm is divided into competition type, election type, random type and other types according to the generation method of the master node.

Figure 2A:
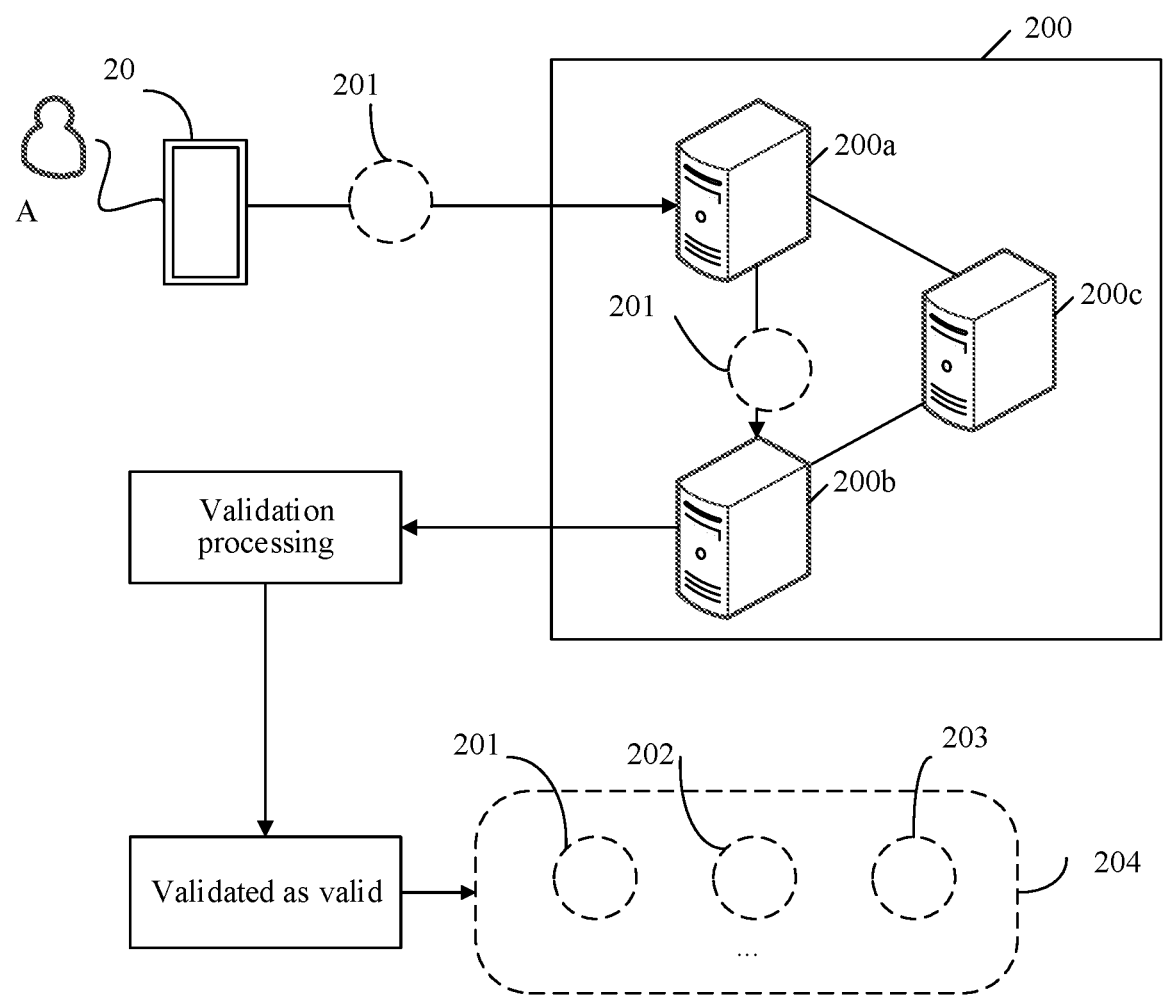
FIG. 2a is a schematic diagram of a scenario of block-chain-based data processing according to an embodiment of the present disclosure.
Figure 2B:
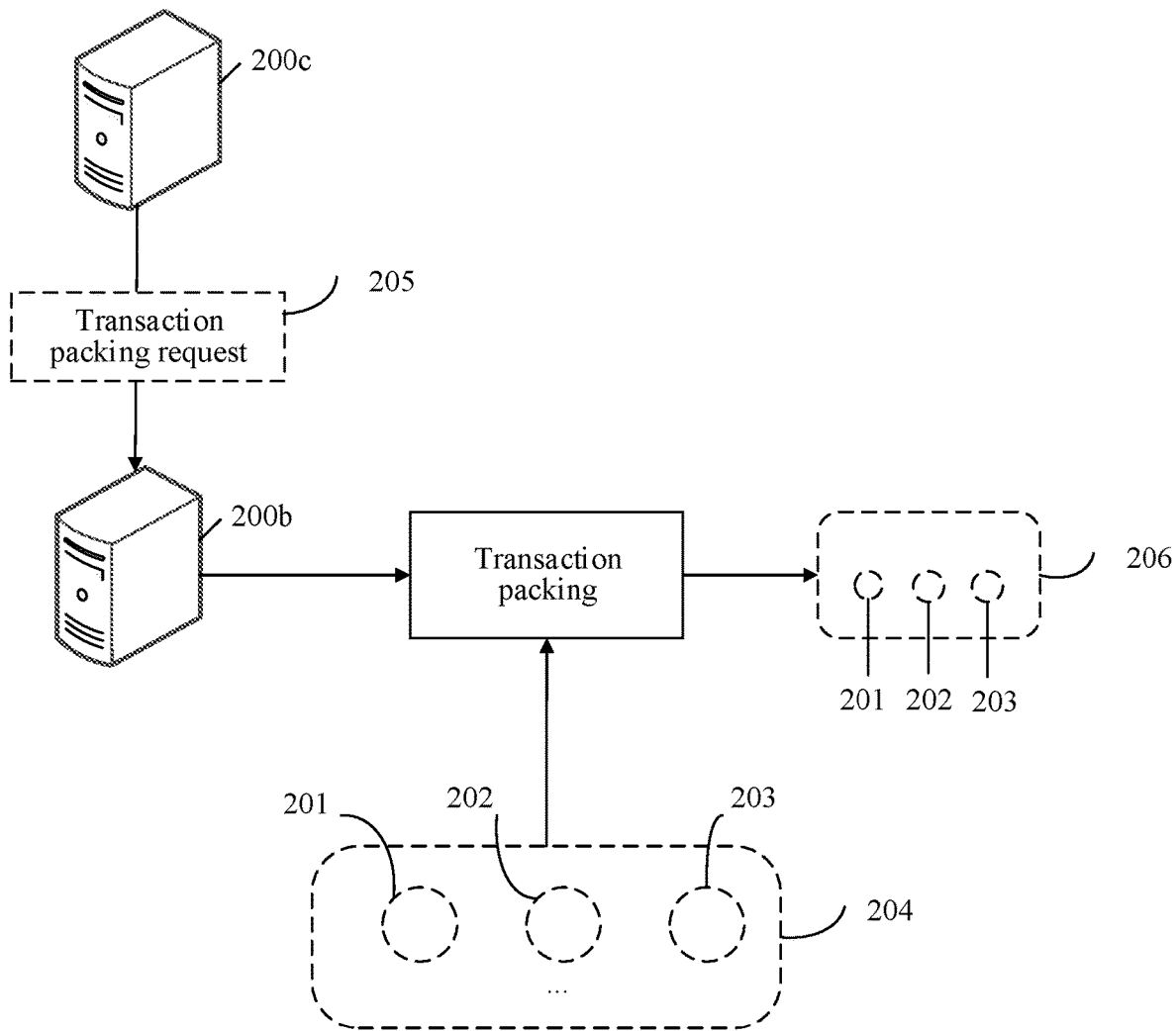
FIG. 2b is a schematic diagram of a scenario of block-chain-based data processing according to an embodiment of the present disclosure.
Figure 2C:
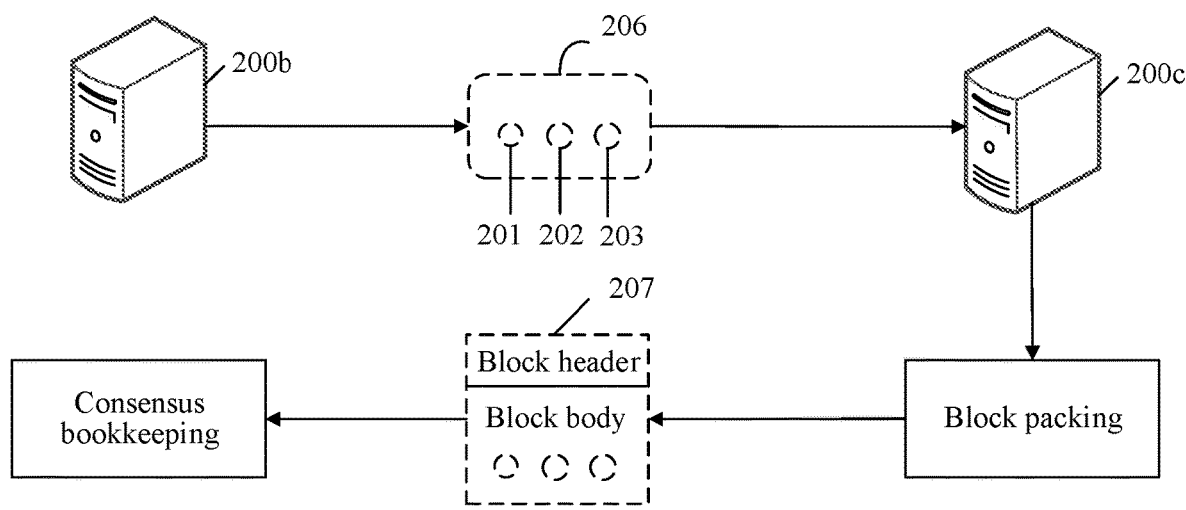
FIG. 2c is a schematic diagram of a scenario of block-chain-based data processing according to an embodiment of the present disclosure.

As an example, FIG. 2a to FIG. 2c are schematic diagrams of scenarios of block-chain-based data processing according to embodiments of the present disclosure. Referring to FIG. 2a, a terminal device 20 corresponding to a transaction initiating object A may be any terminal device in the terminal device cluster 10 in the embodiment corresponding to FIG. 1 above. For example, the terminal device 20 may be the terminal device 10a. Referring to FIG. 2a, a block chain node 200 may be any block chain node in the block chain node cluster 100 in the embodiment corresponding to FIG. 1 above. For example, the block chain node 200 may be a block chain node 101. Therefore, a block chain gateway node 200a in the block chain node 200 may be a block chain gateway node 101a, a transaction processing node 200b in the block chain node 200 may be a transaction processing node 101b, and a block processing node 200c in the block chain node 200 may be a block processing node 101c.

The exemplary application of the block chain network will be described below by taking a transfer scenario as an example.

Referring to FIG. 2a, the terminal device 20 can be integrated with the target application (that is, the target application in FIG. 1 above). A transaction initiating object A may initiate a transaction through the target application, such as transferring 100 yuan to a transaction receiving object B. After the transaction initiating object A inputs the transfer amount through the target application, the terminal device 20 may acquire the relevant parameters through the target application, and then generate transaction data 201. The transaction data 201 needs to go through a series of processes such as transaction broadcasting, transaction signature validation, transaction duplicate validation, block packing, block consensus and transaction execution on the block chain network to finally obtain a corresponding transaction execution result. Then, the transaction data 201 and the transaction execution result corresponding to the transaction data 201 will be written into the block chain ledger. In this case, the account balance of transaction initiating object A will decrease by 100 yuan, and the account balance of the transaction receiving object B will increase by 100 yuan, thus realizing the transaction of the transaction initiating object A.

The exemplary application of the block chain network will be described below by taking logistics service processing as an example.

The terminal device may be integrated with a logistics management application. A transaction initiating object A (a terminal device used by a courier A) may initiate a transaction through the logistics management application, such as storing a delivery address of a target order in the logistics management system. After the transaction initiating object A (the terminal device used by the courier A) inputs relevant parameters through the logistics management application, the terminal device may acquire receiving address information through the logistics management application, and then generate transaction data. The transaction data needs to go through a series of processes such as transaction broadcasting, transaction signature validation, transaction duplicate validation, block packing, block consensus and transaction execution on the block chain network to finally obtain a corresponding transaction execution result. Then, the transaction data and the transaction execution result corresponding to the transaction data will be written into the block chain ledger. In this case, the logistics management system stores the delivery address of the target order, thus realizing the transaction of the transaction initiating object A.

The transaction data needs to go through a series of processes such as transaction broadcasting, transaction signature validation, transaction duplicate validation, block packing, block consensus and transaction execution on the block chain network. These processes are allocated to different nodes, i.e., block chain gateway nodes, transaction processing nodes and block processing nodes. All nodes are independent from each other. When the functions of the block chain nodes are implemented simultaneously, each function is provided with the required hardware resources by the corresponding node. Some functions will not preempt hardware resources among each other, thus reducing the system scheduling consumption and improving the performance of the block chain.

The terminal device 20 transmits the transaction data 201 to the block chain gateway node of any block chain node in the block chain network. Referring to FIG. 2a, the terminal device 20 transmits the transaction data 201 to the block chain gateway node 200a, and then the block chain gateway node 200a forwards the transaction data 201 to the transaction processing node 200b. When the transaction processing node 200b receives the transaction data 201, it performs validation processing on the transaction data 201. After confirming that the transaction data 201 is validated as valid, it will add the transaction data 201 to the transaction pool 204. The validation processing is mainly used for validating whether the source of the transaction data 201 is abnormal, whether the data has been modified, and whether it has been repeatedly received. When the transaction processing node 200b determines that the transaction data 201 is the transaction data initiated by a normal user, the data is not missing or modified in the transmission process and the transaction data 201 is not repeatedly received, the transaction processing node 200b determines that the transaction data 201 is validated as valid. Accordingly, the transaction pool 204 is a temporary list for storing transaction data that each transaction processing node in the block chain network maintains. Referring to FIG. 2a, in addition to the newly added transaction data 201, the transaction pool 204 also stores transaction data 202, transaction data 203 and other transaction data. The transaction data 202, transaction data 203 and other transaction data may be transaction data that are generated by different terminal devices and be added to the transaction pool 204 only after being validated as valid by the transaction processing node.

In the block chain network, the generation of the proposed block is usually completed by the proposer node and the proposer node may be any block chain node in the block chain network. Assuming that the block chain node 200 is a proposer node, referring to FIG. 2b, the block processing node 200c generates a transaction packing request 205, and then transmits the transaction packing request 205 to the transaction processing node 200b. After receiving the transaction packing request 205 transmitted by the block processing node 200c, the transaction processing node 200b acquires at least one transaction data from the transaction pool 204 according to the transaction packing request 205, such as transaction data 201, transaction data 202 and transaction data 203. Then, the transaction processing node 200b performs packing processing on the transaction data 201, transaction data 202 and transaction data 203 to obtain a transaction data packet 206.

After obtaining the transaction data packet 206, the transaction processing node 200b forwards the transaction data packet 206 to the block processing node 200c. Referring to FIG. 2c, after receiving the transaction data packet 206, the block processing node 200c decompresses the transaction data packet 206 to obtain the transaction data 201, transaction data 202 and transaction data 203. Then, the block processing node 200c performs block packing according to the transaction data 201, transaction data 202 and transaction data 203 to obtain a proposed block 207 (i.e., a block that needs subsequent consensus processing). The proposed block 207 includes a block header and a block body. The block header is mainly used for storing the block hash, version number, timestamp, difficulty value and other basic data of the parent block, and may also store other relevant data. The block body is mainly used for storing the transaction data 201, transaction data 202 and transaction data 203. Then, the block processing node 200c performs consensus bookkeeping processing on the proposed block 207, that is, performs consensus processing on the proposed block 207, to obtain a consensus processing result. When the consensus processing result is a consensus pass result, the proposed block is executed to obtain a transaction execution result corresponding to the at least one transaction data, and the proposed block and the transaction execution result are written into a block chain ledger. Accordingly, the functions of the block chain nodes are allocated to different nodes, i.e., block chain gateway nodes, transaction processing nodes and block processing nodes. All nodes are independent from each other. When the functions of the block chain nodes are implemented simultaneously, each function is provided with the required hardware resources by the corresponding node. Some functions will not preempt hardware resources among each other, thus reducing the system scheduling consumption and improving the performance of the block chain.

Figure 3:
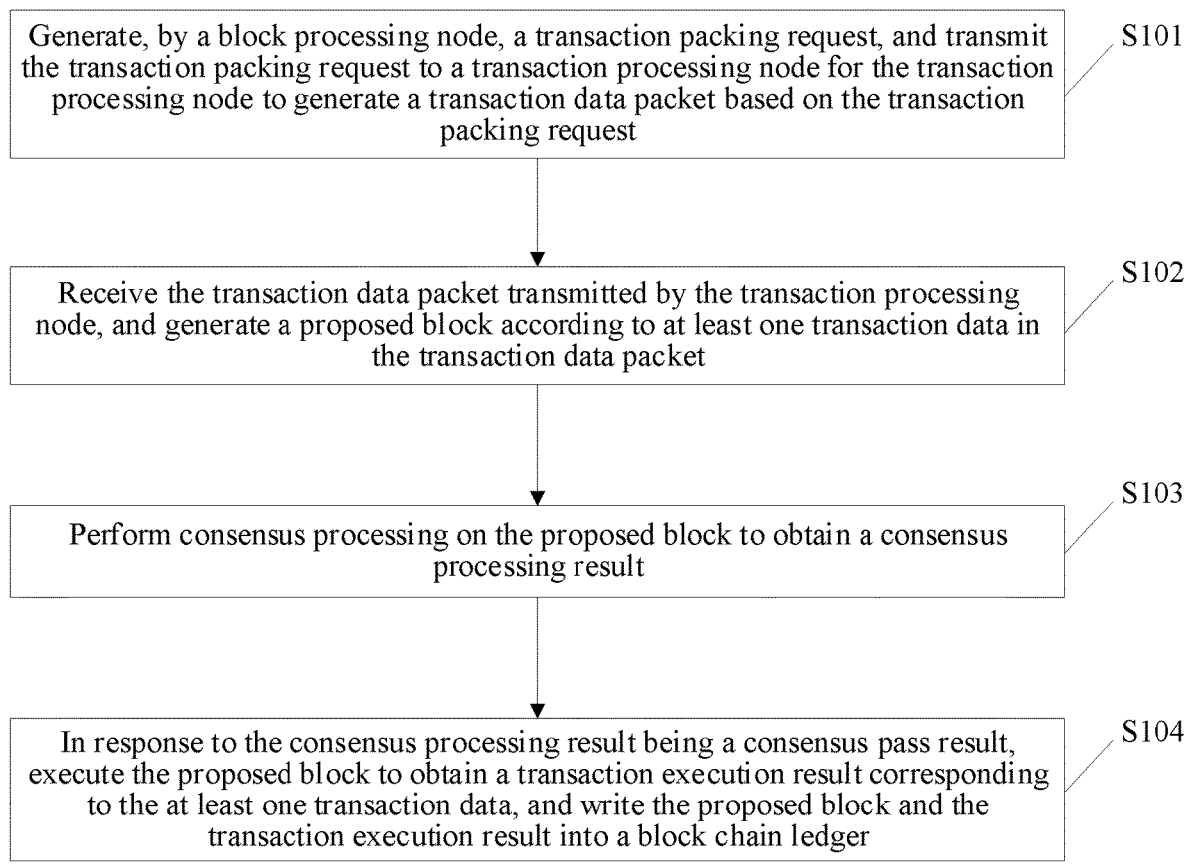
FIG. 3 is a flowchart of a block-chain-based data processing method according to an embodiment of the present disclosure.

FIG. 3 is a flowchart of a block-chain-based data processing method according to an embodiment of the present disclosure. The method may be executed by a block processing node (for example, the block processing node in the embodiment corresponding to FIG. 1 above), or may be executed jointly by the block processing node, a transaction processing node (for example, the transaction processing node in the embodiment corresponding to FIG. 1 above), a block chain gateway node (for example, the block chain gateway node in the embodiment corresponding to FIG. 1 above), and a terminal device (for example, the terminal device in the embodiment corresponding to FIG. 1 above). Description will be made by taking that the method is executed by the block processing node as an example. The block-chain-based data processing method may at least include step S101 to step S104. The block-chain-based data processing method is executed by the block processing node. The block processing node includes at least one computer device.

In step S101, the block processing node generates a transaction packing request, and transmits the transaction packing request to a transaction processing node, so that the transaction processing node generates a transaction data packet based on the transaction packing request. The transaction data packet contains at least one transaction data. The at least one transaction data is transaction data stored in a transaction pool after being validated as valid by the transaction processing node. Hardware device resources of the transaction processing node and the block processing node are independent from each other.

As an example, the block processing node includes at least one computer device, and the transaction processing node also includes at least one computer device. The block processing node and the transaction processing node have an association relationship, that is, the block processing node and the transaction processing node belong to the same block chain node. For example, the transaction processing node 101b and the block processing node 101c in FIG. 1 belong to the same block chain node 101. The block processing node and the transaction processing node may be two different machines. For example, the block processing node is a server A, the transaction processing node is a server B, and the hardware device resources between the server A and the server B are independent from each other, that is, the resources required by the block processing node to work have no relationship with the resources required by the transaction processing node to work, and there will be no resource conflict, and there will also be no system scheduling consumption caused by resource preemption. As an example, the block processing node and the transaction processing node may be deployed in different processes of the same server. Specifically, the block processing node runs in a process A and the transaction processing node runs in a process B. It is to be understood that the process A and the process B are independent from each other. The processes correspond to specific hardware device resources, which are also independent from each other. That is, although both process A and process B run on the same server, the hardware device resources corresponding to the process B cannot be used by the process A.

In step S102, the transaction data packet transmitted by the transaction processing node is received, and a proposed block is generated according to the at least one transaction data in the transaction data packet.

As an example, the proposed block mainly includes a block header and a block body. The block header needs to encapsulate the current version number (Version), the address of the previous block (Prev-block), the timestamp (Timestamp), the random number (Nonce), the target hash (Bits) of the current block, the Merkel tree root value (Merkel-root) and other information. The block body is mainly used for encapsulating the transaction data. Therefore, after the block processing node acquires the transaction data packet, it will firstly decompress the transaction data packet to obtain at least one transaction data in the transaction data packet, then acquire the information required to build the proposed block, and then complete the encapsulation processing of the proposed block to obtain the proposed block.

In step S103, consensus processing is performed on the proposed block to obtain a consensus processing result.

In some embodiments, the block processing node will perform signature processing on the proposed block to obtain block signature data, and then forward the block signature data and the proposed block to a first block chain gateway node. The first block chain gateway node has an association relationship with the block processing node, that is, the first block chain gateway node and the block processing node belong to the same block chain node. For example, the block chain gateway node 101a and the block processing node 101c in FIG. 1 belong to the same block chain node 101. The first block chain gateway node will acquire a communication address of a second block chain gateway node, and forward the block signature data and the proposed block to the second block chain gateway node based on the communication address. As an example, the second block chain gateway node is a block chain gateway node in the block chain network that has no association relationship with the block processing node. Specifically, when the block processing node is the block processing node 101c in FIG. 1 above, the second block chain gateway node may include the block chain gateway node 102a, . . . , and the block chain gateway node included in the block chain node m. When each second block chain gateway node receives the block signature data and the proposed block transmitted by the first block chain gateway node, each second block chain gateway node forwards the proposed block and the block signature data to a communicable block processing node. As an example, the communicable block processing node refers to a block processing node that has an association relationship with the second block chain gateway node. Specifically, when the second block chain gateway node is the block processing node 102a in FIG. 1 above, the block processing node that has an association relationship with the second block chain gateway node is the block processing node 102c. The communicable block processing node performs signature validation on the block signature data, and performs block validation processing on the proposed block to obtain a first block validation result when the signature validation succeeds. The block processing node also performs block validation processing on the proposed block to obtain a second block validation result. Finally, the block processing node may determine a consensus processing result aiming at the proposed block according to the first block validation result and the second block validation result. Through the embodiment of the present disclosure, validation processing can be performed on the proposed block jointly through the communicable block processing node and the block processing node, so as to obtain a more accurate consensus processing result, thus improving the accuracy of consensus processing.

As an example, the process that the block processing node performs block validation processing on the proposed block to obtain a second block validation processing result may be realized through the following technical solution: a block query instruction aiming at the proposed block is generated; the block query instruction is transmitted to the transaction processing node, so that the transaction processing node performs block query processing on the proposed block according to the block query instruction to obtain a second block validation result; and then the second block validation result transmitted by the transaction processing node is received. The purpose of performing block validation processing on the proposed block is to validate the correctness and validity of the transaction data in the proposed block. Accordingly, it can be seen that the validation and storage of the transaction data are completed by the transaction processing node. Therefore, the validation on the proposed block can also be completed by the transaction processing node.

In step S104, when the consensus processing result is a consensus pass result, the proposed block is executed to obtain a transaction execution result corresponding to the at least one transaction data, and the proposed block and the transaction execution result are written into a block chain ledger.

As an example, after the consensus on the proposed block passes, existing the proposed block is specifically executing the transaction in the proposed block, and the block processing node will be responsible for operations such as executing the transaction in the proposed block and storing in the ledger.

As an example, after writing the proposed block and the transaction execution result into the block chain ledger, the block processing node may also generate a transaction completion notification instruction, and then transmit the transaction completion notification instruction to the transaction processing node. The transaction processing node may delete the at least one transaction data in the proposed block in the transaction pool based on the received transaction completion notification instruction, and add the at least one transaction data to the chained transaction buffer pool. The chained transaction buffer pool is used for recording the transaction data that has been written into the block chain ledger, which can improve the query speed.

Through the block-chain-based data processing method according to the embodiment of the present disclosure, the block processing node only needs to transmit a transaction packing request to the transaction processing node, then receive a transaction data packet transmitted by the transaction processing node according to the transaction packing request, and then decompress the received transaction data packet to obtain at least one transaction data contained therein, so that a proposed block can be generated according to the at least one transaction data. After that, the block processing node performs consensus processing on the proposed block. After the consensus passes, the proposed block can be executed, and the obtained transaction execution result and the proposed block corresponding to the at least one transaction data can be written into the block chain ledger. Accordingly, it can be seen that the block processing node does not need to be responsible for validation processing and storage of the transaction data, thus reducing the system scheduling consumption caused by the preemption of resources when various functions are executed at the same time, and improving the performance of the block chain.

Figure 4:
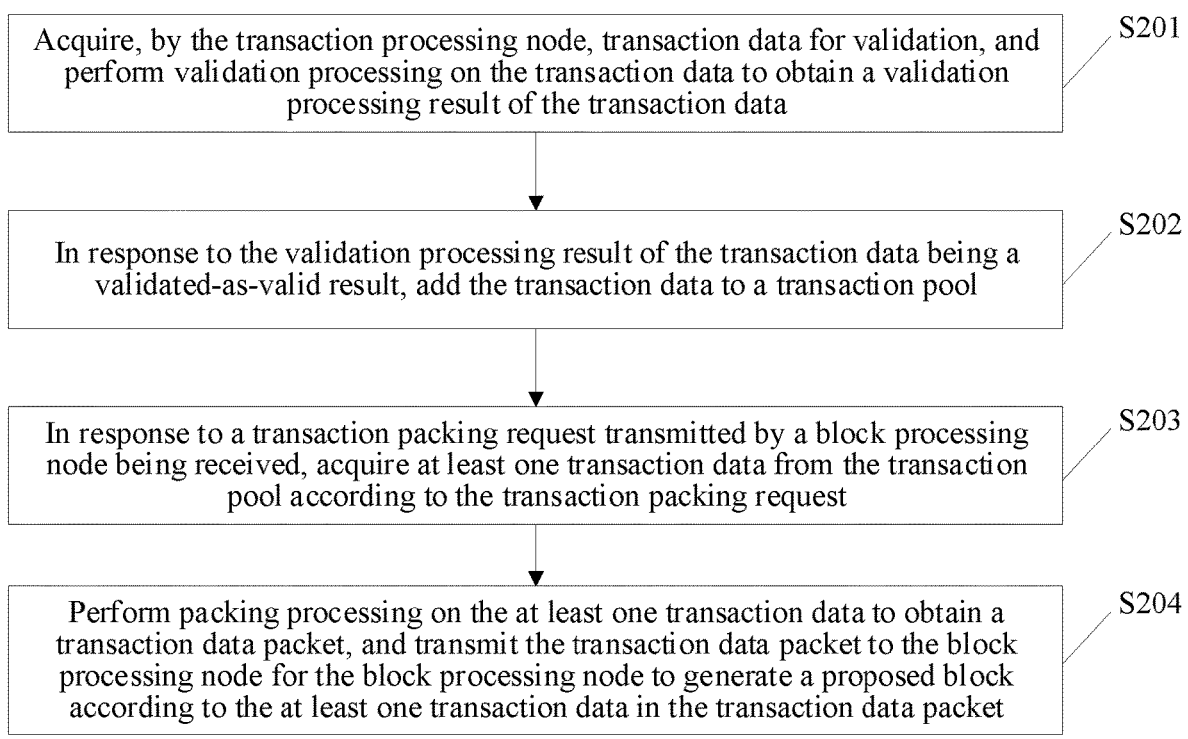
FIG. 4 is a flowchart of a block-chain-based data processing method according to an embodiment of the present disclosure.

In some embodiments, FIG. 4 is a flowchart of a block-chain-based data processing method according to an embodiment of the present disclosure. The block-chain-based data processing method according to the embodiment of the present disclosure may be executed by a transaction processing node (for example, the transaction processing node in the embodiment corresponding to FIG. 1 above), or may be executed jointly by a block processing node (the block processing node in the embodiment corresponding to FIG. 1 above), a transaction processing node, a block chain gateway node (for example, the block chain gateway node in the embodiment corresponding to FIG. 1 above), and a terminal device (for example, the terminal device in the embodiment corresponding to FIG. 1 above). Description will be made by taking that the block-chain-based data processing method according to the embodiment of the present disclosure is executed by the transaction processing node as an example. The block-chain-based data processing method according to the embodiment of the present disclosure may at least include step S201 to step S204. The block-chain-based data processing method is executed by the transaction processing node. The transaction processing node includes at least one computer device.

In step S201, the transaction processing node acquires transaction data for validation (or to-be-validated transaction data), and performs validation processing on the transaction data for validation to obtain a validation processing result of the transaction data for validation.

As an example, the transaction processing node receives the transaction data for validation transmitted by a third block chain gateway node.

In some embodiments, the transaction data for validation received by the third block chain gateway node may be transmitted by the terminal device, that is, the transaction data for validation generated by the terminal device will be transmitted to the third block chain gateway node first, and then the third block chain gateway node will transmit the transaction data for validation to the transaction processing node. As an example, the third block chain gateway node has an association relationship with the transaction processing node, that is, the third block chain gateway node and the transaction processing node belong to the same block chain node. Specifically, the transaction processing node 101b and the block chain gateway node 101a in FIG. 1 belong to the same block chain node 101. At the same time, the transaction processing node will also receive the transaction signature data associated with the transaction data for validation transmitted by the third block chain gateway node. As an example, the transaction signature data is signature data obtained by the terminal device signing the transaction data for validation through a private key of a transaction initiating object. The transaction processing node will acquire the public key of the transaction initiating object and perform signature validation processing on the transaction signature data through the public key to obtain a signature validation result. When the signature validation result is a signature validation pass result, the transaction processing node also performs duplicate validation processing on the transaction data for validation to obtain a duplicate validation processing result. When the duplicate validation processing result is a duplicate validation pass result, the transaction processing node may determine that a validation processing result of the transaction data for validation is a validated-as-valid result. The duplicate validation processing is equivalent to validate whether the transaction data for validation already exists in the block chain ledger. Through the embodiment of the present disclosure, signature validation processing and duplicate validation processing can be performed on the transaction signature data, thus improving the accuracy of validation.

As an example, the signature validation processing will be specifically described as follows: the transaction processing node needs to confirm whether the transaction data has been tampered with halfway, so it uses the public key to decrypt the transaction signature data to obtain a digest value of the transaction data, then uses the pre-agreed hash algorithm to calculate a digest value, and then compares the digest value with the digest value obtained through decryption; when the two are completely consistent, it indicates that the transaction data has not been tampered with, thus representing that the signature validation passes.

In some embodiments, the process that the transaction processing node performs duplicate validation processing on the transaction data for validation can be realized through the following technical solution: the transaction data for validation is searched in a block chain ledger; when the transaction data for validation is found in the block chain ledger, it is determined that the duplicate validation processing result is a duplicate validation fail result; and when the transaction data for validation is not found in the block chain ledger, it is determined that the duplicate validation processing result is a duplicate validation pass result. Through the embodiment of the present disclosure, duplicate validation processing can be performed through the block chain ledger. Since the block chain ledger cannot be tampered with, the reliability of the duplicate validation processing result is high.

As an example, the transaction data for validation received by the third block chain gateway node may be transmitted by a communicable block chain gateway node in the block chain network. As an example, the communicable block chain gateway node refers to a block chain gateway node belonging to other block chain nodes in the block chain network. The transaction data for validation generated by the terminal device may be transmitted to any block chain gateway node in the block chain network, and then forwarded by the block chain gateway node to the transaction processing node that has the association relationship with it. At the same time, the transaction processing node also needs to broadcast the transaction data for validation directly transmitted by the terminal device to other transaction processing nodes, only then can the transaction data stored in the transaction pool of each transaction processing node in the block chain network be kept synchronized. Therefore, when the transaction data for validation generated by the terminal device is transmitted to the communicable block chain gateway node, a communicable transaction processing node that has an association relationship with the communicable block chain gateway node will perform validation processing on the transaction data for validation. When the validation processing result is the validated-as-valid result, the signature validation result is the signature validation pass result and the duplicate validation processing result is the duplicate validation pass result, it represents that it is validated as valid, and the communicable transaction processing node will notify the communicable block chain gateway node to forward the transaction data for validation to the third block chain gateway node. The third block chain gateway node receives the transaction data for validation from the communicable block chain gateway node, and will forward the transaction data for validation to the transaction processing node. The transaction processing node still needs to perform validation processing on the transaction data for validation and add it to the transaction pool after it is validated as valid.

In step S202, when the validation processing result of the transaction data for validation is a validated-as-valid result, the transaction data for validation is added to a transaction pool.

As an example, multiple transaction data may be stored in the transaction pool, and each transaction data is added to the transaction pool only after it is validated as valid by the transaction processing node.

In step S203, when a transaction packing request transmitted by a block processing node is received, at least one transaction data is acquired from the transaction pool according to the transaction packing request.

As an example, hardware device resources of the transaction processing node and the block processing node are independent from each other.

In step S204, packing processing is performed on the at least one transaction data to obtain a transaction data packet, and the transaction data packet is transmitted to the block processing node, so that the block processing node generates a proposed block according to the at least one transaction data in the transaction data packet.

As an example, the transaction processing node is responsible for the validation and storage of the transaction data, and is not responsible for the generation, consensus and bookkeeping of the block. The transaction processing node only needs to acquire at least one corresponding transaction data after receiving the transaction packing request transmitted by the block processing node that has the association relationship, then pack it into a transaction data packet and transmit it to the block processing node. After receiving the transaction data packet, the block processing node will generate the proposed block according to the at least one transaction data in the transaction data packet, and then perform a series of operations such as block consensus and storage in the ledger on the proposed block. For details, it may be referred to the specific description of step S102 to step S104 in FIG. 3.

As an example, when the block processing node passes the consensus on the proposed block, the proposed block is executed to obtain a transaction execution result corresponding to the at least one transaction data. Then, the block processing node will write the proposed block and the transaction execution result into the block chain ledger. The block processing node will generate a transaction completion notification instruction, and then transmit the transaction completion notification instruction to the transaction processing node. After the transaction processing node receives the transaction completion notification instruction, the transaction processing node deletes the at least one transaction data in the transaction pool and adds the at least one transaction data to the chained transaction buffer pool according to the transaction completion notification instruction. Through the embodiment of the present disclosure, the transaction data can be deleted according to the transaction completion notification instruction and added the chained transaction buffer pool, thus realizing the transfer of the transaction data and avoiding data conflicts.

In some embodiments, when the transaction processing node receives a transaction query request aiming at target transaction data generated by a terminal device, it may search the target transaction data in the chained transaction buffer pool according to the transaction query request. When the target transaction data is found in the chained transaction buffer pool, a transaction completion result is transmitted to the terminal device. When the target transaction data is not found in the chained transaction buffer pool, the target transaction data is searched in the block chain ledger. When the target transaction data is found in the block chain ledger, the target transaction data is added to the chained transaction buffer pool and a transaction completion result is transmitted to the terminal device. When the target transaction data is not found in the block chain ledger, a transaction incompletion result is transmitted to the terminal device. Through the embodiment of the present disclosure, two times of query processing are performed in the chained transaction buffer pool and the block chain ledger, and whether the transaction is completed is confirmed based on the query result, thus avoiding data conflicts in the process of block chain data transfer.

In some embodiments, the block processing node needs to perform validation on the transaction data in the proposed block when performing block validation processing on the proposed block, so the block processing node may generate a block query instruction and then transmit it to the transaction processing node. The transaction processing node receives the block query instruction transmitted by the block processing node. The transaction processing node will perform block query processing on the proposed block according to the block query instruction to obtain a block validation result. The block validation result includes a validation pass result or a validation fail result. The validation pass result is used for instructing the block processing node to generate a consensus pass vote for the proposed block. The validation fail result is used for instructing the block processing node to generate a consensus fail vote for the proposed block.

In some embodiments, it is assumed that the proposed block includes transaction data M, which comes from at least one transaction data. The process that the transaction processing node performs block query processing on the proposed block according to the block query instruction to obtain a block validation result may be realized through the following technical solution: the transaction data M is searched in the transaction pool according to the block query instruction; when the transaction data M is found in the transaction pool, it is determined that the transaction data M is valid transaction data; when the transaction data M is not found in the transaction pool, signature validation processing and duplicate validation processing are performed on the transaction data M to obtain a signature validation result and a duplicate validation processing result of the transaction data M; when the signature validation result and the duplicate validation processing result of the transaction data M are validated-as-valid results, it is determined that the transaction data M is valid transaction data; when the signature validation result of the transaction data M or the duplicate validation processing result of the transaction data M is not the validated-as-valid result, it is determined that the transaction data M is invalid transaction data; after the transaction processing node determines whether each transaction data in the proposed block is valid transaction data or invalid transaction data, when each transaction data in the proposed block is valid transaction data, it is determined that the block query result of the proposed block is a validation pass result; and when at least one invalid transaction data exists in the proposed block, it is determined that the block query result of the proposed block is a validation fail result.

Through the block-chain-based data processing method according to the embodiment of the present disclosure, the transaction processing node is responsible for performing validation processing on the received transaction data for validation to obtain a validation processing result of the transaction data for validation. When the validation processing result is a validated-as-valid result, the transaction processing node adds the transaction data for validation to the transaction pool. Therefore, the transaction pool can store a plurality of transaction data validated as valid. As an example, when the transaction processing node receives a transaction packing request from the block processing node, it will acquire at least one transaction data from the transaction pool, packet it into a transaction data packet and transmit it to the block processing node. Accordingly, it can be seen that the transaction processing node only needs to be responsible for validation processing and storage of the transaction data, thus reducing the system scheduling consumption caused by the preemption of resources when various functions that need to be realized by the block chain are executed at the same time, and improving the performance of the block chain.

Figure 5:
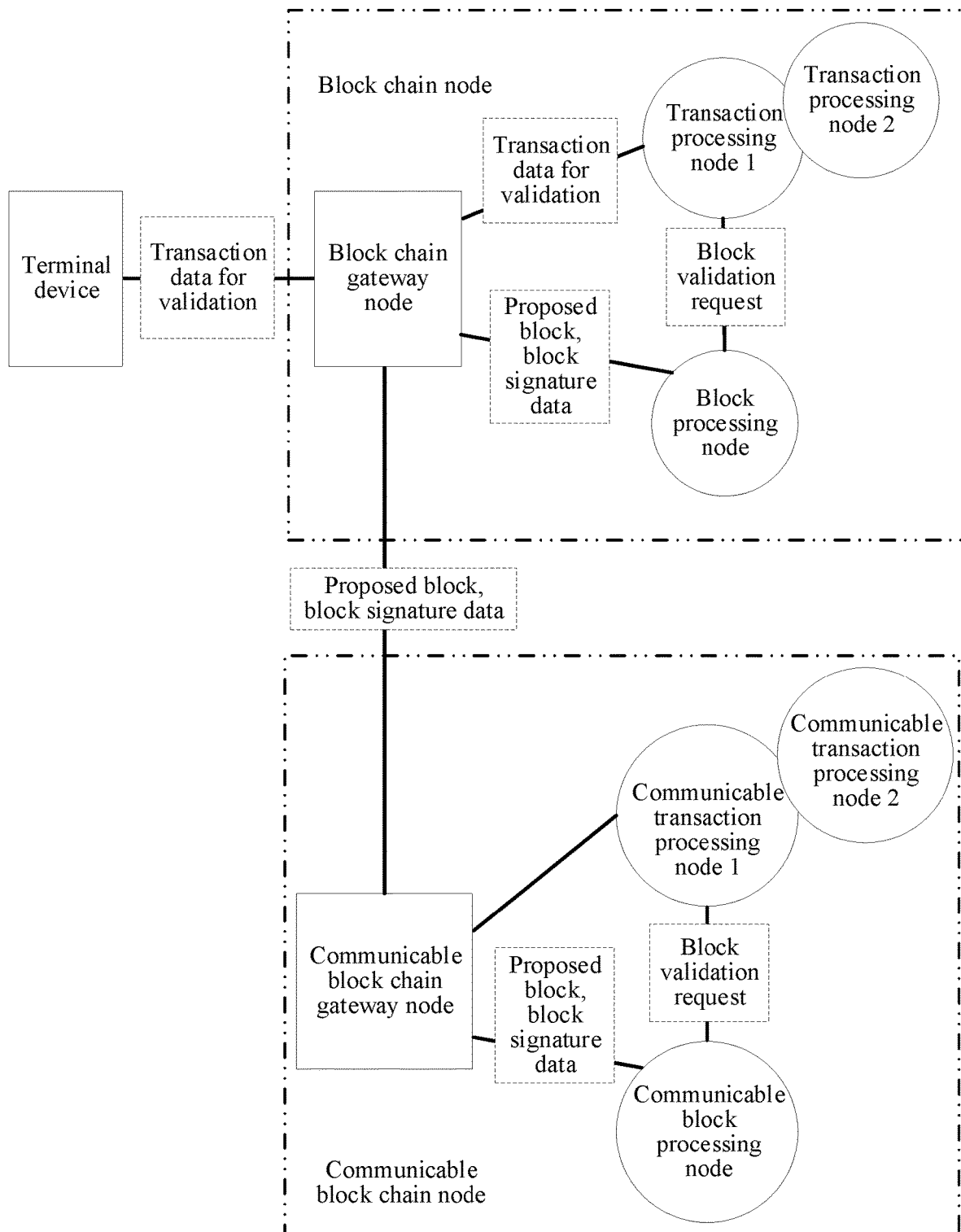
FIG. 5 is a schematic diagram of overall interaction in a data processing method according to an embodiment of the present disclosure.

As an example, FIG. 5 is a schematic diagram of overall interaction in a data processing method according to an embodiment of the present disclosure. Referring to FIG. 5, a block chain node includes a block chain gateway node, a transaction processing node 1, a transaction processing node 2 and a block processing node. A communicable block chain node includes a communicable block chain gateway node, a communicable transaction processing node 1, a communicable transaction processing node 2 and a communicable block processing node. As an example, the block chain node may be any block chain node in the block chain node cluster 100 in FIG. 1 above, and the other block chain nodes may be used as communicable block chain nodes corresponding to the block chain node. It is to be understood that a block chain node may include at least one transaction processing node. These transaction processing nodes are stateless and may work at the same time. Alternatively, only one transaction processing node may work, and the remaining transaction processing nodes are used as alternative transaction processing nodes, and will replace a transaction processing node used for working to continuously work when the transaction processing node fails.

Referring to FIG. 5, the terminal device may transmit the transaction data for validation to the block chain gateway node. After receiving the transaction data for validation, the block chain gateway node will forward the transaction data for validation to the transaction processing node. Assuming that the transaction processing node 1 is in the working state and the transaction processing node 2 is in the standby state, the block chain gateway node will forward the transaction data for validation to the transaction processing node 1, and the transaction processing node 1 will add the transaction data for validation validated as valid to the transaction pool. Exemplary validation processing process may refer to step S201 in FIG. 4, which will not be repeated here. When the block chain node acts as the proposer node, the block chain node and the transaction processing node 1 will perform data interaction with each other to generate a proposed block, that is, the block processing node transmits a transaction packing request to the transaction processing node 1, and the transaction processing node 1 acquires at least one transaction data from the transaction pool according to the transaction packing request, then packs it into a transaction data packet and returns it to the block processing node, and the block processing node may generate a proposed block based on at least one transaction data from the transaction pool transmitted by the transaction processing node 1. Exemplary implementation process that the block processing node and the transaction processing node perform data interaction with each other to generate the proposed block may refer to the description of step S101 and step S102 in FIG. 3. The block processing node will perform signature processing on the proposed block to obtain block signature data. The block processing node will forward the proposed block and the block signature data to the block chain gateway node.

Referring to FIG. 5, after receiving the block signature data and the proposed block forwarded by the block processing node, the block chain gateway node will acquire a communication address of a communicable block chain gateway node, and then forward the block signature data and the proposed block to the communicable block chain gateway node based on the communication address. When the communicable block chain gateway node receives the block signature data and the proposed block, the communicable block chain gateway node performs consensus voting on the proposed block based on the block signature data. The process that the communicable block chain gateway node performs consensus voting on the proposed block based on the block signature data may be realized through the following technical solution: the communicable block chain gateway node performs signature validation processing on the block signature data; when the signature validation succeeds, the communicable block chain gateway node transmits a block validation request to the communicable transaction processing node 1, and then waits for a first block validation result returned by the communicable transaction processing node 1; the communicable block chain gateway node will perform voting on the proposed block according to the first block validation result, that is, when the first block validation result is a validation pass result, a consensus pass vote is generated for the proposed block; when the first block validation result is a transaction fail result, a consensus fail vote is generated for the proposed block. Similarly, after the block processing node generates the proposed block, it also needs to perform consensus voting on the proposed block. The block processing node may transmit a block validation request to the transaction processing node 1, and then wait for a second block validation result returned by the transaction processing node 1. The block processing node will perform voting on the proposed block according to the second block validation result, that is, when the second block validation result is a validation pass result, a consensus pass vote is generated for the proposed block. When the second block validation result is a transaction fail result, a consensus fail vote is generated for the proposed block. Finally, both the block processing node and the communicable block processing node will determine the consensus processing result of the proposed block based on the voting result of the block processing node and the voting result of the communicable block chain gateway node. When the consensus passes, both the block processing node and the communicable block processing node will execute the proposed block to obtain a transaction execution result, and write the proposed block and the transaction execution result into their respective block chain ledgers. Exemplary implementation process that the communicable transaction processing node 1 obtains the first block validation result and the transaction processing node 1 obtains the second block validation result may refer to the specific description of the exemplary data processing process in FIG. 4.

To sum up, in the overall interaction process of the data processing method, the block chain gateway nodes can perform data interaction with the terminal device, the communicable block chain gateway node, the transaction processing node and the block processing node respectively. As an example, the block chain gateway node may enable the standby transaction processing node 2 to replace the transaction processing node 1 when the transaction processing node 1 fails. Referring to FIG. 5, the block chain gateway node may transmit a heartbeat message to the transaction processing node 1. When the transaction processing node 1 receives the heartbeat message, it will generate a response message and return it to the block chain gateway node. When the block chain gateway node does not receive the response message from the transaction processing node 1 within a target time period, the block chain gateway node may determine the transaction processing node 1 as a fault transaction processing node and select the first standby transaction processing node, such as transaction processing node 2. When the block chain gateway node receives new transaction data for validation transmitted by the terminal device, it will transmit the new transaction data for validation to the first standby transaction processing node, i.e., transaction processing node 2, instead of transmitting it to the transaction processing node 1. The block chain gateway node may transmit a heartbeat message to the transaction processing node 1 at a fixed frequency, such as once every five minutes. After the transaction processing node 1 fails, the block chain gateway node enables the transaction processing node 2. This process is transparent to the communicable block chain node and will not influence the work of the communicable block chain node.

As an example, the block chain gateway node may also play the role of a load balancer. Referring to FIG. 5, the block chain gateway node may monitor the load situation of the transaction processing node 1. When the load situation of the transaction processing node 1 is an overload situation (the real-time load data volume of the transaction processing node 1 is more than a data volume threshold), it will select the second standby transaction processing node, such as transaction processing node 2. When the block chain gateway node receives first transaction data for validation and second transaction data for validation transmitted by the terminal device, the block chain gateway node may transmit the first transaction data for validation to the transaction processing node 1 and the second transaction data for validation to the second standby transaction processing node, i.e., transaction processing node 2. The transaction processing node 1 will add the first transaction data for validation validated as valid to the transaction pool, and the transaction processing node 2 will add the second transaction data for validation validated as valid to the standby transaction pool.

As an example, in order to better understand the data interaction process in the data processing method, jointly referring to FIG. 6a to FIG. 6f, which are schematic diagrams of local interaction in the data processing method according to the embodiment of the application.

Figure 6A:
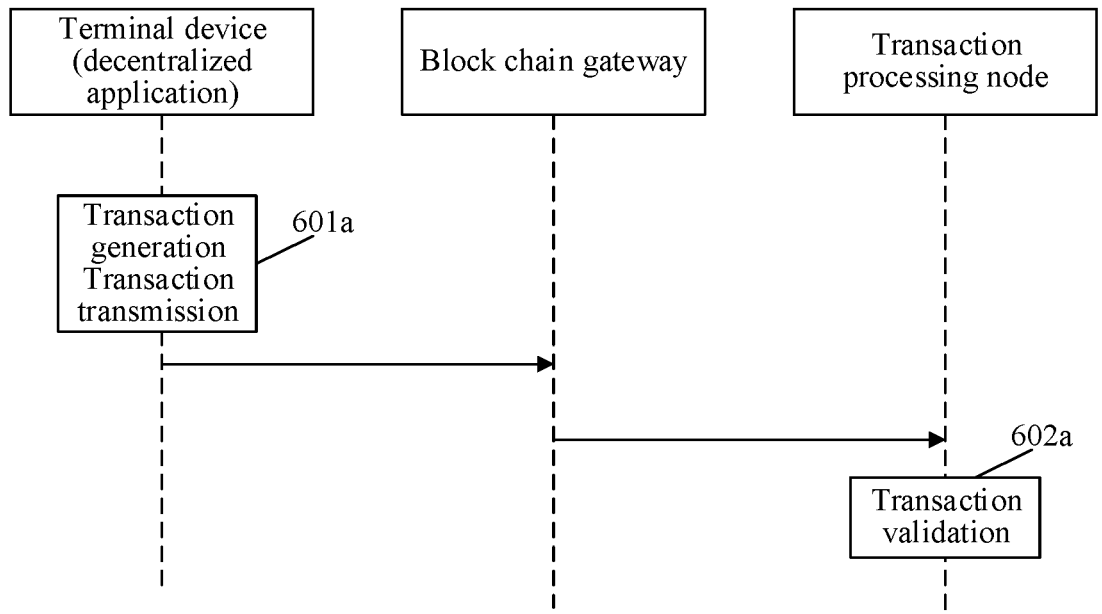
FIG. 6a is a schematic diagram of interaction for forwarding a transaction by a block chain gateway node according to an embodiment of the present disclosure.

FIG. 6a is a schematic diagram of interaction for forwarding a transaction by a block chain gateway node according to an embodiment of the present disclosure. Referring to FIG. 6a, in step 601a, the terminal device generates a transaction and transmits the transaction. Specifically, the transaction initiating object may initiate a transaction through the decentralized application in the terminal device. After the terminal device generates the transaction, i.e., transaction data for validation, it will transmit the transaction data for validation to the block chain gateway. After receiving the transaction data for validation, the block chain gateway will forward it to the transaction processing node. In step 602a, the transaction processing node performs transaction validation. Specifically, the transaction processing node performs transaction validation on the transaction data for validation. Transaction validation includes transaction signature validation and transaction duplicate validation processes. The transaction that passes the validation will be stored in the transaction pool. Exemplary implementation of transaction validation may refer to the specific description of step S201 to step S202 in FIG. 4, which will not be repeated here.

Figure 6B:
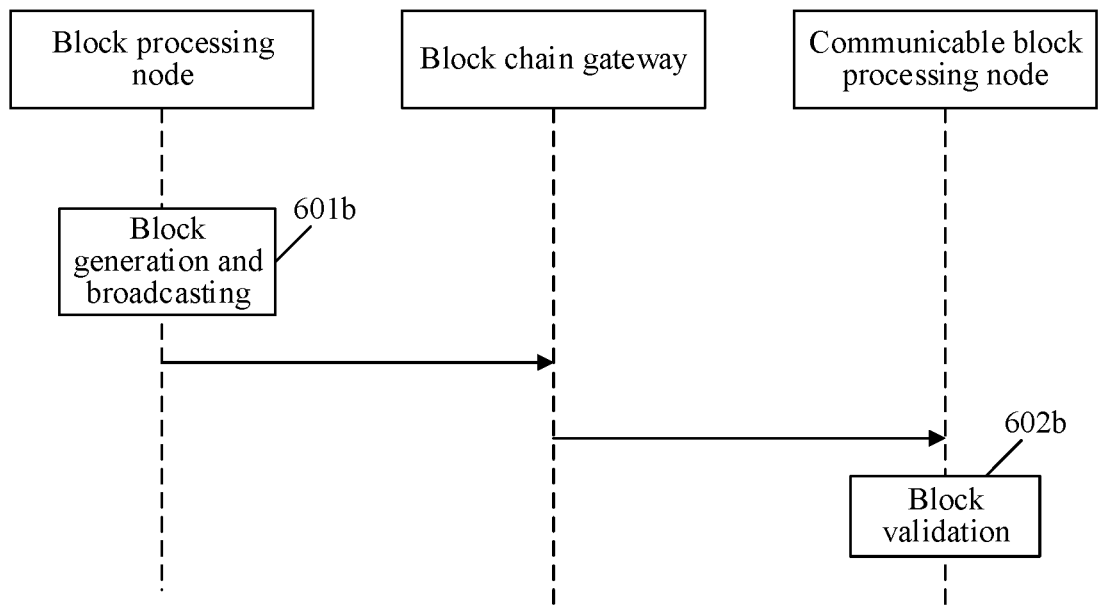
FIG. 6b is a schematic diagram of interaction for forwarding a proposed block by a block chain gateway according to an embodiment of the present disclosure.

FIG. 6b is a schematic diagram of interaction for forwarding a proposed block by a block chain gateway according to an embodiment of the present disclosure. Referring to FIG. 6b, in step 601b, the block processing node performs block generation and broadcasting processing. Specifically, after the proposed block is generated, the block processing node needs to forward the proposed block to a communicable block processing node through the block chain gateway. In step 602b, the communicable block node performs block validation, and the communicable block processing node will perform block validation on the proposed block after receiving it, and then generate consensus voting information. At the same time, the consensus voting information of the block processing node and the communicable block processing node aiming at the proposed block also needs to be forwarded by the block chain gateway.

Figure 6C:
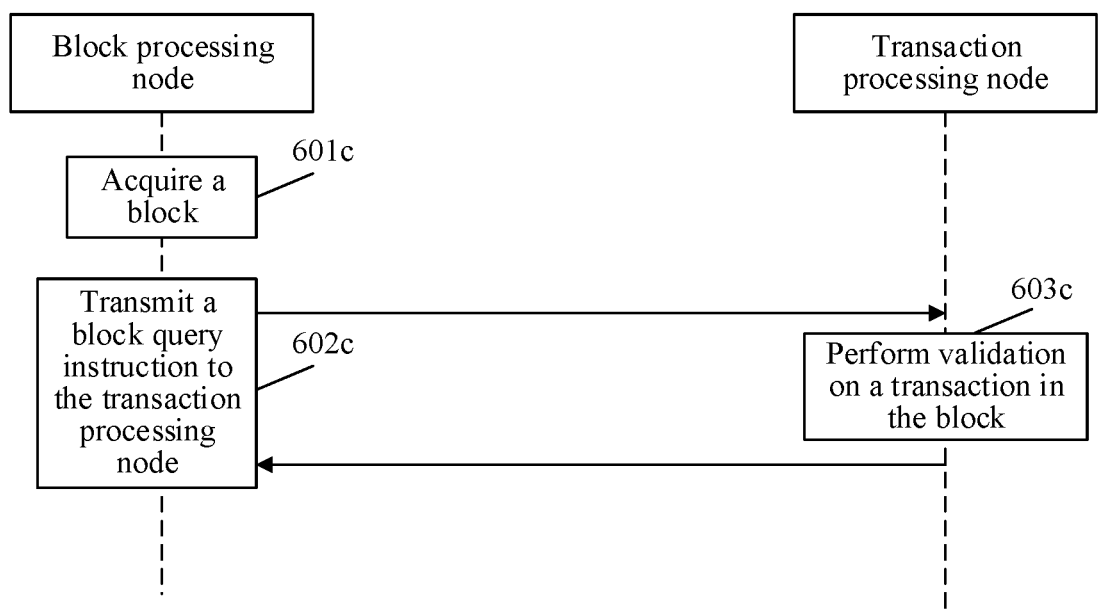
FIG. 6c is a schematic diagram of interaction for completing block validation by a transaction processing node and a block processing node according to an embodiment of the present disclosure.

FIG. 6c is a schematic diagram of interaction for completing block validation by a transaction processing node and a block processing node according to an embodiment of the present disclosure. Referring to FIG. 6c, in step 601c, the block processing node acquires the block. Specifically, the block processing node receives the proposed block. In step 602c, the block processing node will transmit a block query instruction to the transaction processing node. In step 603c, the transaction processing node performs validation on the transaction in the block. Specifically, the transaction processing node performs block query processing on the transaction in the proposed block to obtain a block validation result. Exemplary process of block query processing may refer to the description of the exemplary method in FIG. 4, which will not be repeated here. It is to be understood that when a block processing node acting as a proposer node generates a proposed block, it may perform block validation on the generated proposed block; when a communicable processing node acting as a non-proposer node receives the proposed block, it may perform the same block validation process as the block processing node.

Figure 6D:
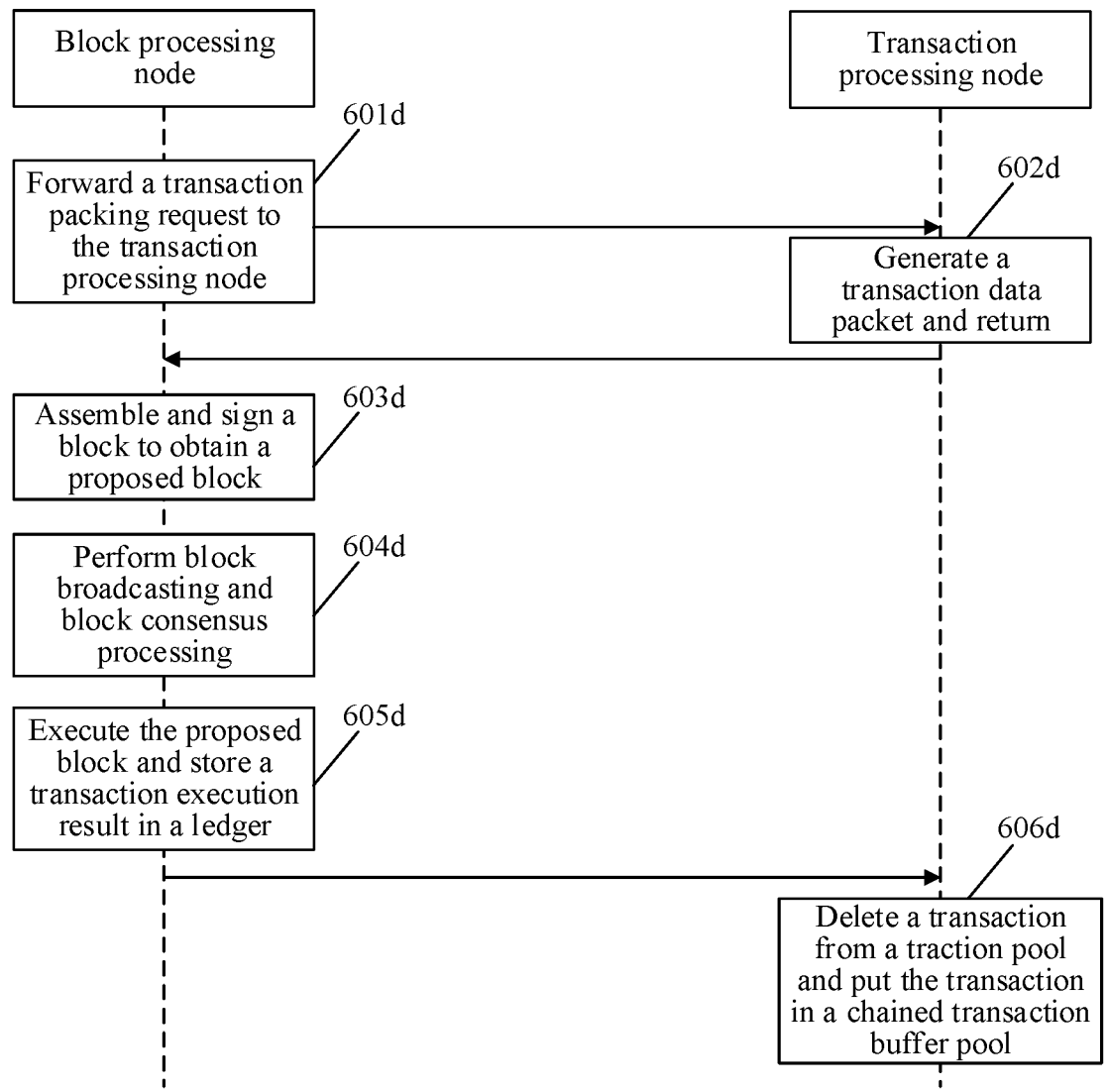
FIG. 6d is a schematic diagram of interaction for completing block packing by a transaction processing node and a block processing node according to an embodiment of the present disclosure.

FIG. 6d is a schematic diagram of interaction for completing block packing by a transaction processing node and a block processing node according to an embodiment of the present disclosure. Referring to FIG. 6d, in step 601d, the block processing node forwards a transaction packing request to the transaction processing node. Specifically, when the block processing node acts as the proposer node, it will forward the transaction packing request to the transaction processing node. In step 602d, the transaction processing node generates a transaction data packet and returns it. Specifically, the transaction processing node picks up the transaction from the transaction pool, packs it and returns it to the block processing node. In step 603c, the block processing node assembles the block and signs the block to obtain a proposed block. Specifically, the block processing node relays to complete the block assembling work, including filling of block prehash, block signature and the like, to obtain a proposed block. In step 604d, the block processing node performs block broadcasting and block consensus processing. In step 605d, the block processing node executes the proposed block and stores a transaction execution result in the ledger. Specifically, the block processing node performs block broadcasting, block consensus and other operations on the proposed block. When the consensus processing result of the proposed block is a consensus pass result, the proposed block is executed to obtain a transaction execution result, and the proposed block and the transaction execution result are written into the block chain ledger. Then, the block processing node will notify the transaction processing node. After receiving the notification, the transaction processing node will execute step 606*d*. The transaction processing node will delete the transaction from the transaction pool and put it into a chained transaction buffer pool. Specifically, the transaction processing node will delete the transaction that has been written into the block chain ledger from the transaction pool and put it into a chained transaction buffer pool for subsequent quick query.

Figure 6E:
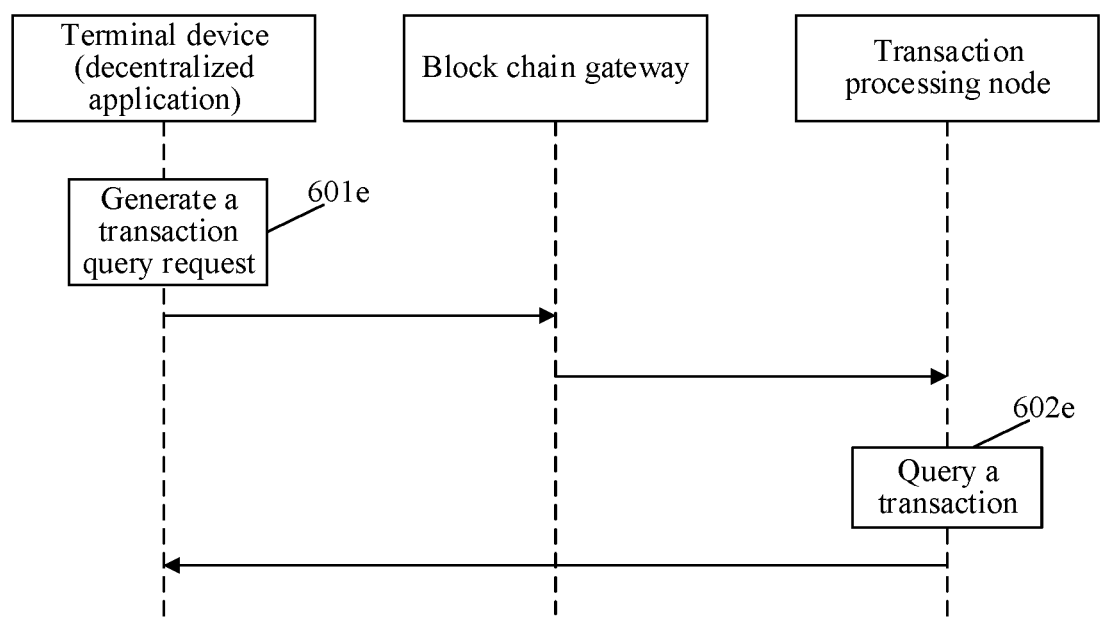
FIG. 6e is a schematic diagram of data interaction for querying a transaction according to an embodiment of the present disclosure.

FIG. 6*e* is a schematic diagram of data interaction for querying a transaction according to an embodiment of the present disclosure. Referring to FIG. 6*e*, in step 601*e*, the terminal device generates a transaction query request. Specifically, after the terminal device generates a transaction query request through a decentralized application, and transmits it to the block chain gateway, and the block chain gateway will forward the transaction query request to the transaction processing node. In step 602*e*, the transaction processing node queries the transaction. Specifically, the transaction processing node firstly checks whether the to-be-queried transaction exists in the transaction buffer pool. If it exists, a transaction completion result is returned directly. Otherwise, the transaction is queried from the ledger. If data is found, a transaction completion result is returned and stored in the transaction buffer pool.

Figure 6F:
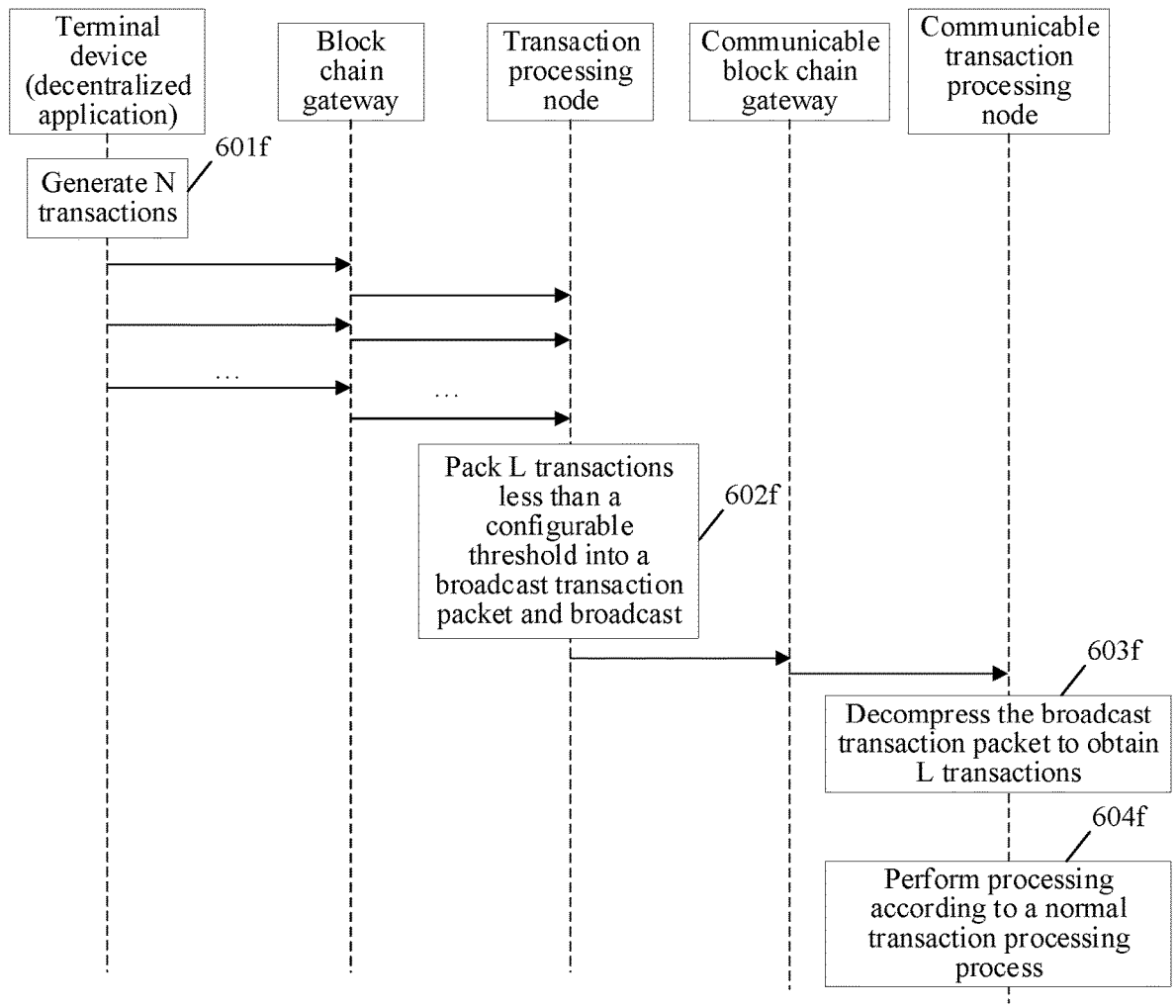
FIG. 6f is a schematic diagram of data interaction for broadcasting a plurality of small transactions according to an embodiment of the present disclosure.

FIG. 6*f* is a schematic diagram of data interaction for broadcasting a plurality of small transactions according to an embodiment of the present disclosure. Referring to FIG. 6*f*, in step 601*f*, the terminal device generates N transactions. Specifically, the terminal device may generate a plurality of transactions, i.e., N transaction data for validation, and transmit them to the block chain gateway together. N is a positive integer. The block chain gateway will transmit the N transaction data for validation to the transaction processing node together. The transaction processing node will perform validation on the N transaction data for validation, and add the N transaction data for validation validated as valid to the transaction pool. In step 602*f*, the transaction processing node packs L transactions that are less than a configurable threshold into a broadcast transaction and broadcasts it. Specifically, the transaction processing node will select L transaction data for validation from the N transaction data for validation added to the transaction pool to perform transaction packing processing to obtain a broadcast transaction packet. L is a positive integer. The total data capacity of the L transaction data for validation is less than a configurable capacity threshold. Then, the transaction processing node will transmit the broadcast transaction packet to the communicable block chain gateway node, and then the communicable block chain network node will forward the broadcast transaction packet to the communicable transaction processing node. As an example, the process that the transaction processing node transmits the broadcast transaction packet to the communicable block chain gateway node may be realized through the following technical solution: the transaction processing node transmits the broadcast transaction packet to the block chain gateway node, and the block chain gateway node will acquire a communication address of a communicable block chain gateway node and forward the broadcast transaction packet to a communicable transaction processing node based on the communication address. In step 603*f*, the communicable transaction processing node decompresses the broadcast transaction packet to obtain L transactions. Specifically, the communicable transaction processing node decompresses the broadcast transaction packet into L transaction data for validation. In step 604*f*, the communicable transaction node processes according to a normal transaction processing process. Specifically, the communicable transaction processing node performs validation on the received L transaction data for validation according to a normal transaction processing process, and adds the L transaction data for validation validated as valid to its transaction pool.

Through the block-chain-based data processing method according to the embodiment of the present disclosure, transaction validation, transaction broadcasting and other operations are allocated to the transaction processing node to complete, and block packing, block consensus, transaction execution, storage in ledger and other operations are allocated to the block processing node to complete. The two use independent hardware resources, so that some functions will not preempt hardware resources among each other when the functions are implemented at the same time. Moreover, the block chain gateway node is added to cooperatively complete the forwarding of data, so that the block chain architecture is clear, the service division is clearer and the data interaction process between nodes is proper and orderly, thus reducing the system scheduling consumption and improving the performance of the block chain. In addition, in the embodiment of the present disclosure, the transaction processing node may pack a plurality of small transactions into a broadcast transaction packet for broadcasting, thus reducing message headers, reducing the number of network transmissions, and improving the efficiency of message transmission.

Figure 7:
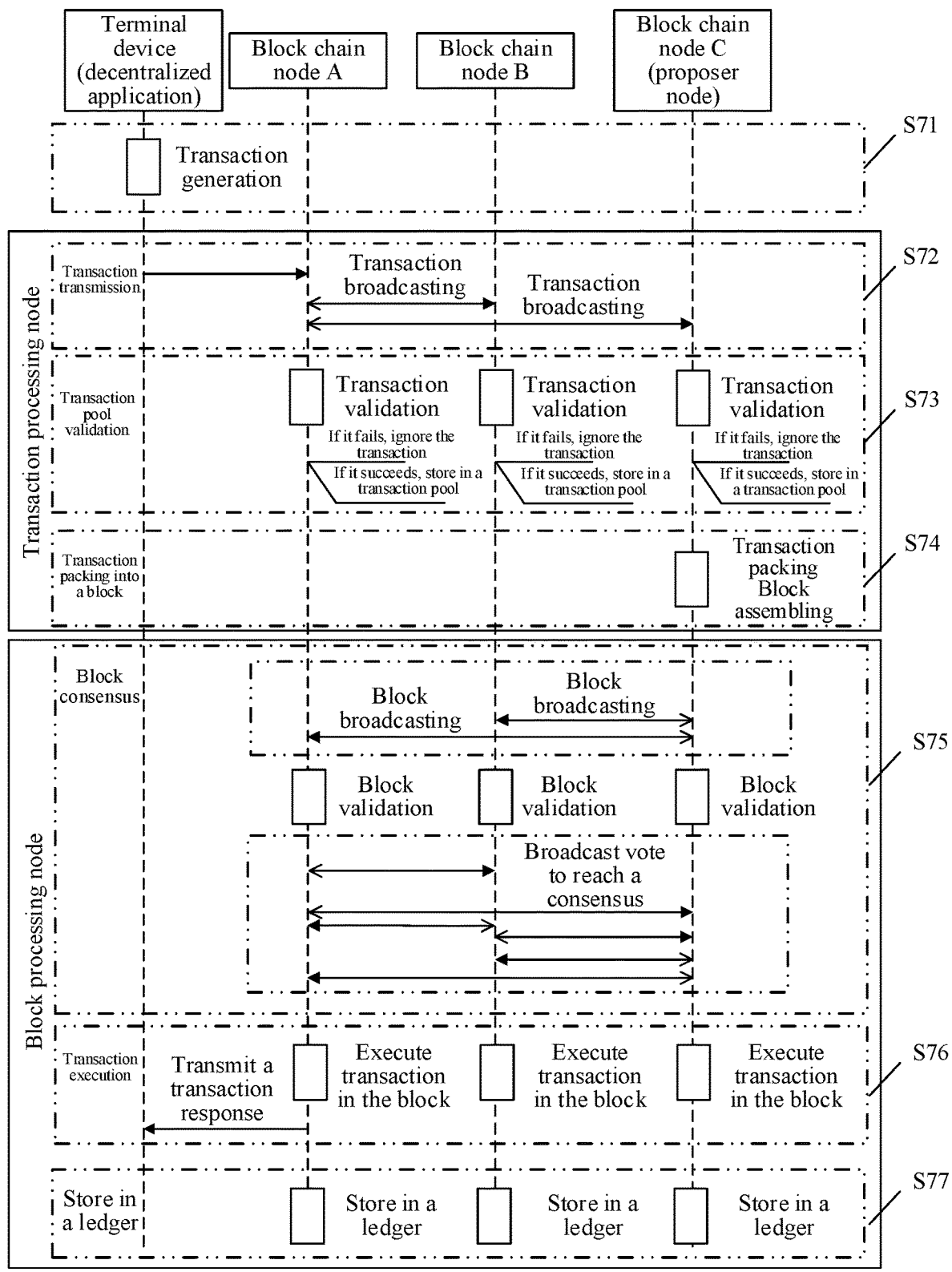
FIG. 7 is a schematic diagram of a block-chain-based transaction processing process according to an embodiment of the present disclosure.

As an example, FIG. 7 is a schematic diagram of a block-chain-based transaction processing process according to an embodiment of the present disclosure. Block chain transaction processing involves a terminal device (for example, any terminal device in the terminal device cluster 10 in FIG. 1 above) and a block chain node cluster in a block chain network (for example, the block chain node cluster 100 in FIG. 1 above). For the convenience of subsequent description, description will be made by taking that the block chain node cluster includes a block chain node A, a block chain node B and a block chain node C as an example. Each block chain node may be composed of a block chain gateway node, a transaction processing node and a block processing node. Within the block chain node, the block chain gateway node and the transaction processing node may communicate with each other, the transaction processing node and the block processing node may communicate with each other, and the block chain gateway node and the block processing node may communicate with each other. Communication between the block chain nodes is realized by the block chain gateway node. Referring to FIG. 7, a block chain transaction processing proses may include the following steps:

In step S71, a terminal device performs transaction generation processing.

Specifically, a terminal device may generate a transaction through a decentralized application (also called transaction data, i.e., the transaction data for validation in the embodiment corresponding to FIG. 4 above).

In step S72, the terminal device performs transaction transmission processing.

Specifically, the terminal device will transmit the transaction to a certain block chain node in the block chain network, such as the block chain node A, and then the block chain node A will broadcast the transaction to other block chain nodes in the block chain network, i.e., the block chain node B and the block chain node C. The terminal device transmits the transaction to the block chain node A, which actually transmits the transaction to the block chain gateway node of the block chain node A, and then forwards the transaction from the block chain gateway node of the block chain node A to the transaction processing node of the block chain node A. Exemplary interaction process may refer to the description in FIG. 6a, which will not be repeated here. Exemplary process that the block chain node A broadcasts the transaction to the other block chain nodes may refer to the description in FIG. 6f, which will not be repeated here.

In step S73, each block chain node in the block chain network performs transaction pool validation processing.

Specifically, each block chain node in the block chain network needs to perform transaction validation on the acquired transaction. When the transaction fails, the transaction is ignored. When the transaction succeeds, the transaction will be stored in the transaction pool. The block chain nodes performs transaction validation through the transaction processing node. Exemplary process of transaction validation may refer to the specific description of step S201 to step S202 in FIG. 4, which will not be repeated here.

In step S74, a proposer node packs the transaction into a block.

Specifically, a proposer node needs to acquire at least one transaction from the transaction pool, and then generate a proposed block based on the at least one transaction. The proposer node may be any block chain node in the block chain network. Referring to FIG. 7, assuming that block chain node C is the proposer node, the transaction processing node and the block processing node of the block chain node C will jointly complete the generation of the proposed block. Exemplary interaction implementation process may refer to the specific description in FIG. 6d, which will not be repeated here.

In step S75, each block chain node in the block chain network performs block consensus processing.

Specifically, after the block chain node C generates the proposed block, the proposed block needs to be broadcast to the other block chain nodes first, that is, the block processing node of the block chain node C will broadcast the proposed block to the block processing nodes of the other block chain nodes. Exemplary implementation process may refer to the specific description in FIG. 6b above, which will not be repeated here. Then, the block processing node of each block chain node performs block validation on the proposed block to obtain a block validation result. Exemplary implementation of the block validation process may refer to the description in FIG. 6c, which will not be repeated here.

Specifically, when the block validation result is a validation pass result, the block processing node of the block chain node will generate a consensus pass vote for the proposed block. When the block validation result is a validation fail result, the block processing node of the block chain node will generate a consensus fail vote for the proposed block. Then, the voting result of each block chain node will be broadcast to the other block chain nodes. When the number of the block chain nodes that generate a consensus pass vote for the proposed block exceeds a consensus threshold, it is determined that the consensus on the proposed block passes.

In step S76, each block chain node performs transaction execution processing.

Specifically, each block chain node will execute the at least one transaction in the proposed block after confirming that the consensus on the proposed block passes, to obtain a transaction execution result. Referring to FIG. 7, transaction execution is implemented by the block processing node.

In step S77, the block processing node performs processing of storage in a ledger.

Specifically, the block processing node of each block chain node will write the proposed block and the transaction execution result into the block chain ledger.

The embodiment of the present disclosure divides the functions of the block chain node into the block processing nodes and the transaction processing nodes. Each node operates in a separate process or hardware device and uses independent hardware resources, thus reducing the time consumed by system scheduling caused by the preemption of system hardware resources by various functions, and improving the performance and throughput of the block chain.

Figure 8:
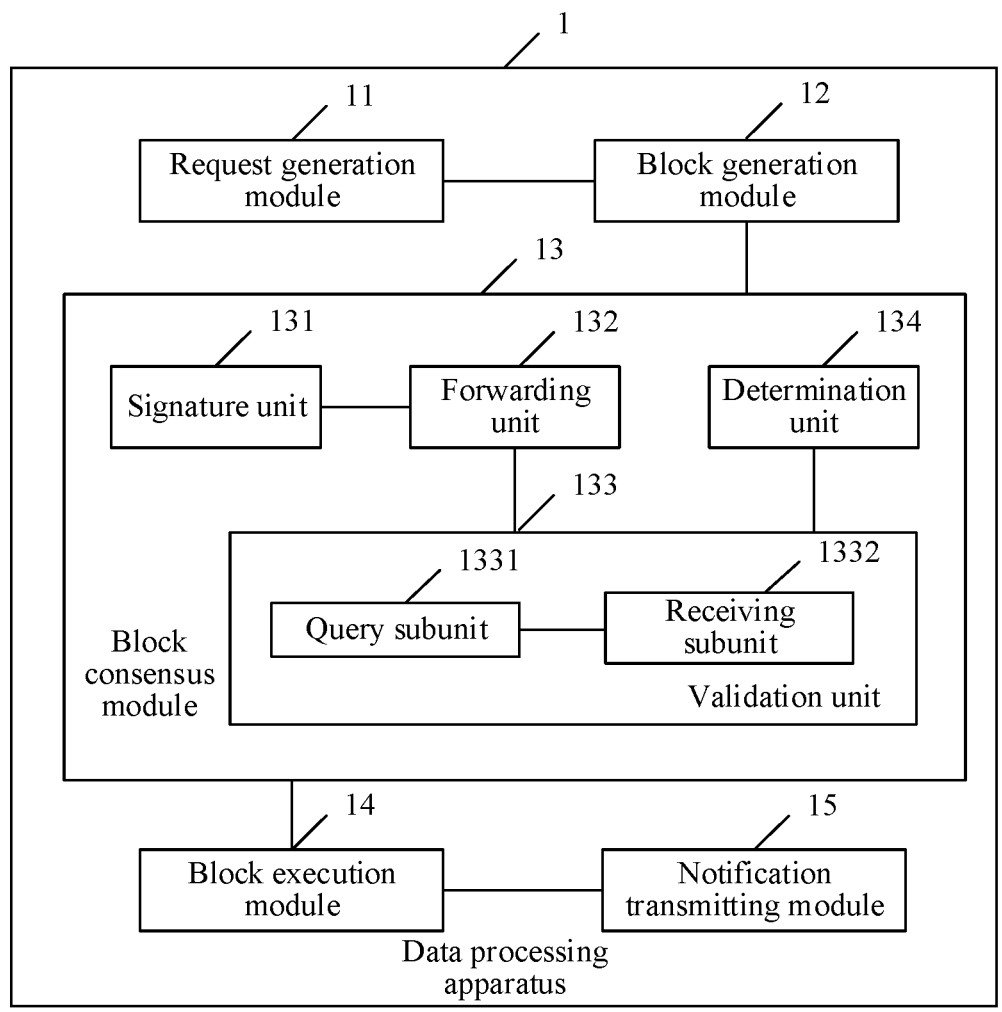
FIG. 8 is a schematic structural diagram of a block-chain-based data processing apparatus according to an embodiment of the present disclosure.

FIG. 8 is a schematic structural diagram of a block-chain-based data processing apparatus according to an embodiment of the present disclosure. The data processing apparatus may be a computer program (including program code) running in a computer device. For example, the data processing apparatus may be application software. The apparatus can be used for executing the corresponding steps in the data processing method according to the embodiment of the present disclosure. Referring to FIG. 8, the data processing apparatus 1 may include a request generation module 11, a block generation module 12, a block consensus module 13 and a block execution module 14.

The request generation module 11 is configured to generate a transaction packing request, and transmit the transaction packing request to a transaction processing node, so that the transaction processing node generates a transaction data packet based on the transaction packing request. The transaction data packet contains at least one transaction data. The at least one transaction data is transaction data stored in a transaction pool after being validated as valid by the transaction processing node. Hardware device resources of the transaction processing node and the block processing node are independent from each other.

The block generation module 12 is configured to receive the transaction data packet transmitted by the transaction processing node, and generate a proposed block according to the at least one transaction data in the transaction data packet.

The block consensus module 13 is configured to perform consensus processing on the proposed block to obtain a consensus processing result.

The block execution module 14 is configured to, when the consensus processing result is a consensus pass result, execute the proposed block to obtain a transaction execution result corresponding to the at least one transaction data, and write the proposed block and the transaction execution result into a block chain ledger.

Exemplary implementations of the request generation module 11, the block generation module 12, the block consensus module 13 and the block execution module 14 may also refer to the description of step S101 to step S104 in FIG. 3, which will not be repeated herein.

Referring to FIG. 8, the block consensus module 13 may include a signature unit 131, a forwarding unit 132, a validation unit 133 and a determination unit 134.

The signature unit 131 is configured to perform signature processing on the proposed block to obtain block signature data.

The forwarding unit 132 is configured to forward the block signature data and the proposed block to a first block chain gateway node, so that the first block chain gateway node acquires a communication address of a second block chain gateway node, and forwards the block signature data and the proposed block to the second block chain gateway node based on the communication address. The second block chain gateway node is configured to forward the proposed block to a communicable block processing node. The communicable block processing node is configured to perform signature validation on the block signature data, and perform block validation processing on the proposed block to obtain a first block validation result when the signature validation succeeds.

The validation unit 133 is configured to perform block validation processing on the proposed block to obtain a second block validation result.

The determination unit 134 is configured to determine a consensus processing result aiming at the proposed block according to the first block validation result and the second block validation result.

Exemplary implementations of the signature unit 131, the forwarding unit 132, the validation unit 133 and the determination unit 134 may also refer to the description of step S103 in FIG. 3, which will not be repeated here.

Referring to FIG. 8, the validation unit 133 may include a query subunit 1331 and a receiving subunit 1332.

The query subunit 1331 is configured to generate a block query instruction aiming at the proposed block.

The query subunit 1331 is further configured to transmit the block query instruction to the transaction processing node, so that the transaction processing node performs block query processing on the proposed block according to the block query instruction to obtain a second block validation result.

The receiving subunit 1332 is configured to receive the second block validation result transmitted by the transaction processing node.

Exemplary implementations of the query subunit 1331 and the receiving subunit 1332 may refer to the description of step S103 in FIG. 3, which will not be repeated here.

Referring to FIG. 8, the data processing apparatus 1 may further include a notification transmitting module 15.

The notification transmitting module 15 is configured to, after the proposed block and the transaction execution result are written into the block chain ledger, generate a transaction completion notification instruction and transmit the transaction completion notification instruction to the transaction processing node, so that the transaction processing node deletes the at least one transaction data in the transaction pool based on the transaction completion notification instruction and adds the at least one transaction data to a chained transaction buffer pool.

Exemplary implementation of the notification transmitting module 15 may also refer to the exemplary description of step S104 in FIG. 3, which will not be repeated here.

Figure 9:
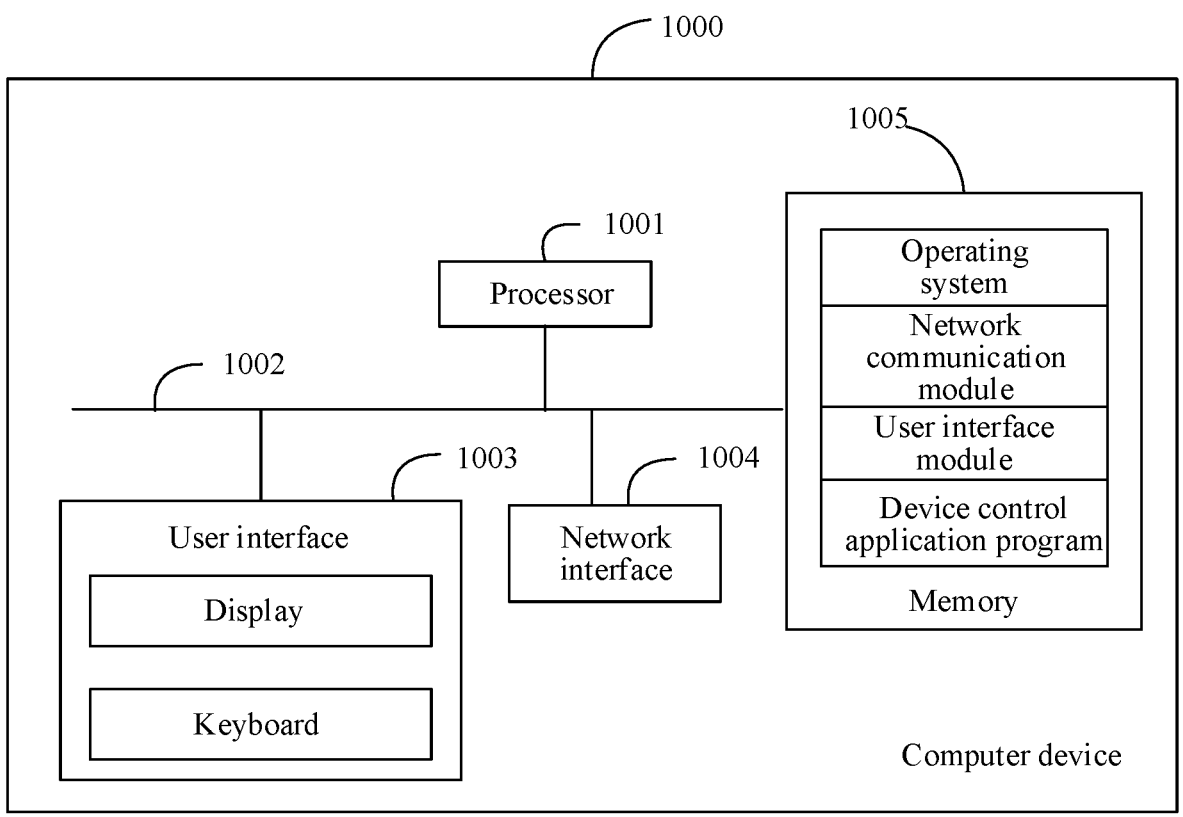
FIG. 9 is a schematic structural diagram of a computer device according to an embodiment of the present disclosure.

FIG. 9 is a schematic structural diagram of a computer device according to an embodiment of the present disclosure. Referring to FIG. 9, the data processing apparatus 1 in the embodiment corresponding to FIG. 8 may be applied to the computer device 9000. The computer device 9000 may include a processor 9001, a network interface 9004 and a memory 9005. In addition, the computer device 9000 may further include a user interface 9003 and at least one communication bus 9002. The communications bus 9002 is configured to implement connection and communication between the components. The user interface 9003 may include a display and a keyboard. In some embodiments, the user interface 9003 may further include a standard wired interface and a standard wireless interface. As an example, the network interface 9004 may include a standard wired interface and a standard wireless interface (such as WI-FI interface). The memory 9005 may be a high-speed RAM memory, or a non-volatile memory, for example, at least one magnetic disk memory. As an example, the memory 9005 may be at least one storage apparatus located away from the processor 9001. Referring to FIG. 9, the memory 9005 used as a computer-readable storage medium may include an operating system, a network communications module, a user interface module, and a device control application program.

In the computer device 9000 illustrated in FIG. 9, the network interface 9004 can provide a network communication function. The user interface 9003 is mainly configured to provide an input interface for the user. The processor 9001 may be configured to call the device control application program stored in the memory 9005 to implement the following processing: generating a transaction packing request, and transmitting the transaction packing request to a transaction processing node, so that the transaction processing node generates a transaction data packet based on the transaction packing request, the transaction data packet containing at least one transaction data; the at least one transaction data being transaction data stored in a transaction pool after being validated as valid by the transaction processing node; hardware device resources of the transaction processing node and the block processing node being independent from each other; receiving the transaction data packet transmitted by the transaction processing node, and generating a proposed block according to the at least one transaction data in the transaction data packet; performing consensus processing on the proposed block to obtain a consensus processing result; and when the consensus processing result is a consensus pass result, executing the proposed block to obtain a transaction execution result corresponding to the at least one transaction data, and writing the proposed block and the transaction execution result into a block chain ledger.

It is to be understood that the computer device 1000 described in the embodiment of the present disclosure can execute the description of the data processing method in each of the above embodiments, and can also execute the description of the data processing apparatus 1 in the embodiment corresponding to FIG. 8 above, which will not be repeated here. In addition, the description of beneficial effects of the same method will not be described herein again.

An embodiment of the present disclosure further provides a computer-readable storage medium in which the computer program executed by the data processing apparatus 1 mentioned above is stored. When the processor loads and executes the computer program, it can execute the description of the data processing method in any one of the embodiments above, which will not be repeated here. In addition, the description of beneficial effects of the same method will not be described herein again. For technical details that are not disclosed in the computer-readable storage medium embodiment of the present disclosure, referring to the descriptions of the method embodiments of the present disclosure.

Figure 10:
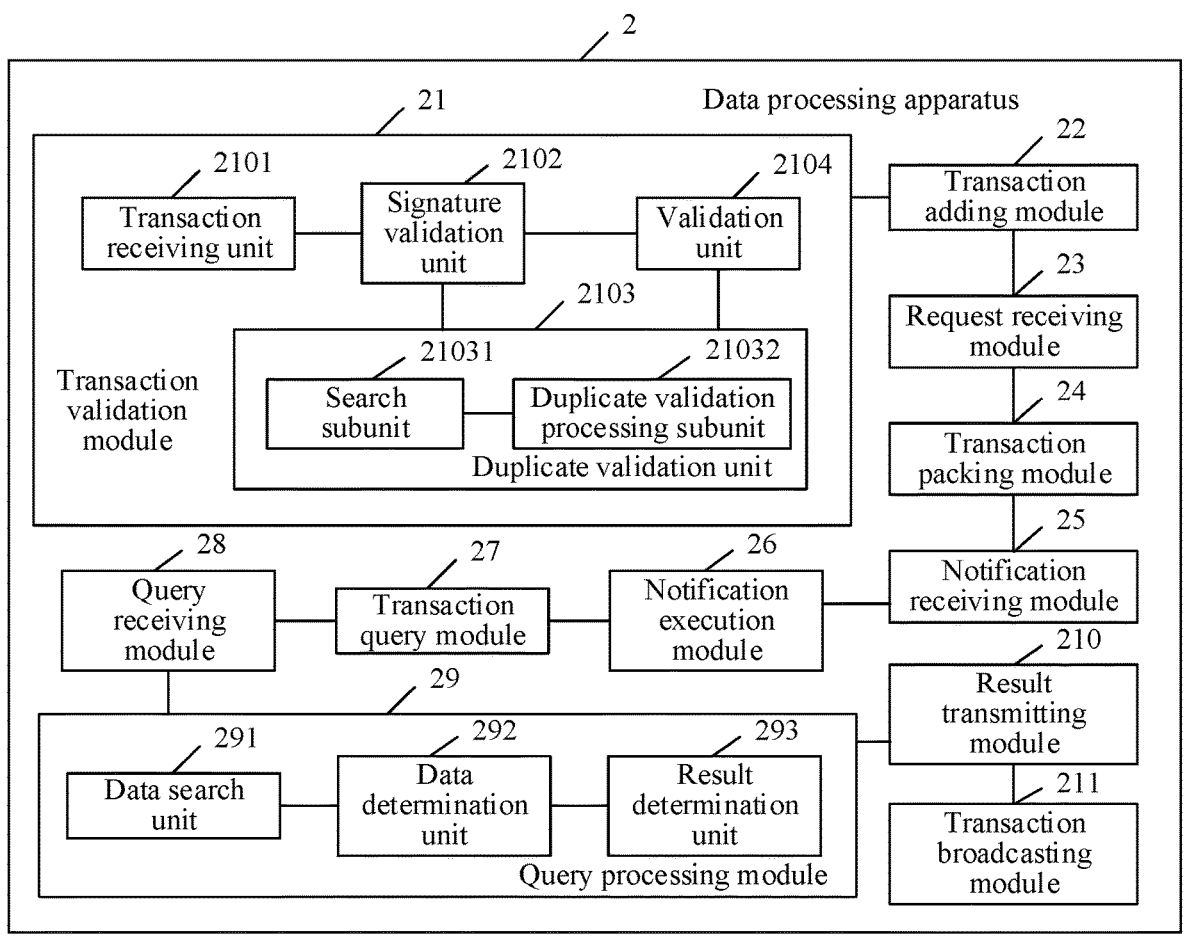
FIG. 10 is a schematic structural diagram of a block-chain-based data processing apparatus according to an embodiment of the present disclosure.

FIG. 10 is a schematic structural diagram of a block-chain-based data processing apparatus according to an embodiment of the present disclosure. The data processing apparatus may be a computer program (including program code) running in a computer device. For example, the data processing apparatus may be application software. The data processing apparatus can be used for executing the corresponding steps in the block-chain-based data processing method according to the embodiment of the present disclosure. Referring to FIG. 10, the data processing apparatus 2 may include a transaction validation module 21, a transaction adding module 22, a request receiving module 23 and a transaction packing module 24.

The transaction validation module 21 is configured to acquire transaction data for validation, and perform validation processing on the transaction data for validation to obtain a validation processing result of the transaction data for validation.

The transaction adding module 22 is configured to, when the validation processing result of the transaction data for validation is a validated-as-valid result, add the transaction data for validation to a transaction pool.

The request receiving module 23 is configured to, when a transaction packing request transmitted by a block processing node is received, acquire at least one transaction data from the transaction pool according to the transaction packing request. Hardware device resources of the transaction processing node and the block processing node are independent from each other.

The transaction packing module 24 is configured to perform packing processing on the at least one transaction data to obtain a transaction data packet, and transmit the transaction data packet to the block processing node, so that the block processing node generates a proposed block according to the at least one transaction data in the transaction data packet.

Exemplary implementations of the transaction validation module 21, the transaction adding module 22, the request receiving module 23 and the transaction packing module 24 may also refer to the description of step S201 to step S204 in FIG. 4, which will not be repeated here.

Referring to FIG. 10, the transaction validation module 21 may include a transaction receiving unit 2101, signature validation unit 2102, a duplicate validation unit 2103 and validation unit 2104.

The transaction receiving unit 2101 is configured to receive the transaction data for validation transmitted by a third block chain gateway node. The third block chain gateway node is configured to forward the transaction data for validation to the transaction processing node when the transaction data for validation transmitted by a terminal device is received.

The transaction receiving unit 2101 is further configured to receive transaction signature data associated with the transaction data for validation transmitted by the third block chain gateway node. The transaction signature data is signature data obtained by the terminal device signing the transaction data for validation through a private key of a transaction initiating object.

The signature validation unit 2102 is configured to acquire the public key of the transaction initiating object and perform signature validation processing on the transaction signature data through the public key to obtain a signature validation result.

The duplicate validation unit 2103 is configured to, when the signature validation result is a signature validation pass result, perform duplicate validation processing on the transaction data for validation to obtain a duplicate validation processing result.

The validation unit 2104 is configured to, when the duplicate validation processing result is a duplicate validation pass result, determine that a validation processing result of the transaction data for validation is a validated-as-valid result.

Exemplary implementations of the transaction receiving unit 2101, the signature validation unit 2102, the duplicate validation unit 2103 and the validation unit 2104 may refer to the description of step S201 in FIG. 4, which will not be repeated here.

Referring to FIG. 10, the duplicate validation unit 2103 may include a search subunit 21031 and a duplicate validation processing subunit 21032.

The search subunit 21031 is configured to search the transaction data for validation in a block chain ledger.

The duplicate validation processing subunit 21032 is configured to, when the transaction data for validation is found in the block chain ledger, determine that the duplicate validation processing result is a duplicate validation fail result.

The duplicate validation processing subunit 21032 is further configured to, when the transaction data for validation is not found in the block chain ledger, determine that the duplicate validation processing result is a duplicate validation pass result.

Exemplary implementations of the search subunit 21031 and the duplicate validation processing subunit 21032 may also refer to the description of step S201 in FIG. 4, which will not be repeated here.

Referring to FIG. 10, the data processing apparatus 2 may further include a notification receiving module 25 and a notification execution module 26.

The notification receiving module 25 is configured to receive a transaction completion notification instruction transmitted by the block processing node. The transaction completion notification instruction is generated after the block processing node writes the proposed block and the transaction execution result into the block chain ledger. The transaction execution result is a transaction execution result corresponding to the at least one transaction data obtained by executing the proposed block, and the proposed block is executed by the block processing node when a consensus on the proposed block passes.

The notification execution module 26 is configured to delete the at least one transaction data in the transaction pool according to the transaction completion notification instruction and add the at least one transaction data to a chained transaction buffer pool.

Exemplary implementations of the notification receiving module 25 and the notification execution module 26 may also refer to the exemplary description of step S204 in FIG. 4, which will not be repeated here.

Referring to FIG. 10, the data processing apparatus 2 may further include a transaction query module 27.

The transaction query module 27 is configured to receive a transaction query request aiming at target transaction data generated by a terminal device, and search the target transaction data in the chained transaction buffer pool according to the transaction query request.

The transaction query module 27 is further configured to, when the target transaction data is found in the chained transaction buffer pool, transmit a transaction completion result to the terminal device.

The transaction query module 27 is further configured to, when the target transaction data is not found in the chained transaction buffer pool, search the target transaction data in the block chain ledger.

The transaction query module 27 is further configured to, when the target transaction data is found in the block chain ledger, add the target transaction data to the chained transaction buffer pool and transmit a transaction completion result to the terminal device.

The transaction query module 27 is further configured to, when the target transaction data is not found in the block chain ledger, transmit a transaction incompletion result to the terminal device.

Exemplary implementation of the transaction query module 27 may also refer to the exemplary description of step S204 in FIG. 4, which will not be repeated here.

Referring to FIG. 10, the data processing apparatus 2 may further include a query receiving module 28, a query processing module 29 and a result transmitting module 210.

The query receiving module 28 is configured to receive a block query instruction transmitted by the block processing node. The block query instruction is generated when the block processing node generates the proposed block.

The query processing module 29 is configured to perform block query processing on the proposed block according to the block query instruction to obtain a block validation result.

The result transmitting module 210 is configured to transmit the block validation result to the block processing node, so that the block processing node performs consensus voting on the proposed block according to the block validation result.

Exemplary implementations of the query receiving module 28, the query processing module 29 and the result transmitting module 210 may also refer to the description of step S204 in FIG. 4, which will not be repeated here.

The block validation result includes a validation pass result or a validation fail result. The validation pass result is used for instructing the block processing node to generate a consensus pass vote for the proposed block. The validation fail result is used for instructing the block processing node to generate a consensus fail vote for the proposed block. The proposed block includes transaction data M, and the transaction data M comes from the at least one transaction data.

Referring to FIG. 10, the query processing module 29 may include a data search unit 291, a data determination unit 292 and a result determination unit 293.

The data search unit 291 is configured to search the transaction data M in the transaction pool according to the block query instruction.

The data search unit 291 is further configured to, when the transaction data M is found in the transaction pool, determine that the transaction data M is valid transaction data.

The data search unit 291 is further configured to, when the transaction data M is not found in the transaction pool, perform signature validation processing and duplicate validation processing on the transaction data M to obtain a signature validation result and a duplicate validation processing result of the transaction data M.

The data determination unit 292 is configured to, when the signature validation result of the transaction data M and the duplicate validation processing result of the transaction data M are validated-as-valid results, determine that the transaction data M is valid transaction data; when the signature validation result of the transaction data M or the duplicate validation processing result of the transaction data M is not the validated-as-valid result, determine that the transaction data M is invalid transaction data.

The result determination unit 293 is configured to, when each transaction data in the proposed block is valid transaction data, determine that the block query result of the proposed block is a validation pass result.

The result determination unit 293 is further configured to, when at least one invalid transaction data exists in the proposed block, determine that the block query result of the proposed block is a validation fail result.

Exemplary implementations of the data search unit 291, the data determination unit 292 and the result determination unit 293 may also refer to the description of step S204 in FIG. 4, which will not be repeated here.

Referring to FIG. 10, the data processing apparatus 2 may further include a transaction broadcasting module 211.

The transaction broadcasting module 211 is configured to select L transaction data for validation from the N transaction data for validation added to the transaction pool to perform transaction packing processing to obtain a broadcast transaction packet. L is a positive integer. The total data capacity of the L transaction data for validation is less than a configurable capacity threshold.

The transaction broadcasting module 211 is further configured to transmit the broadcast transaction packet to a fourth block chain gateway node, so that the fourth block chain gateway node acquires a communication address of a fifth block chain gateway node and forwards the broadcast transaction packet to the fifth block chain gateway node based on the communication address. The fifth block chain gateway node is configured to forward the broadcast transaction packet to a communicable transaction processing node. The communicable transaction processing node is configured to decompress the broadcast transaction packet into the L transaction data for validation, and add the L transaction data for validation to the transaction pool to which the communicable transaction processing node belongs when the L transaction data for validation is validated as valid.

Exemplary implementation of the transaction broadcasting module 211 may also refer to the specific description in FIG. 6f, which will not be repeated here.

Figure 11:
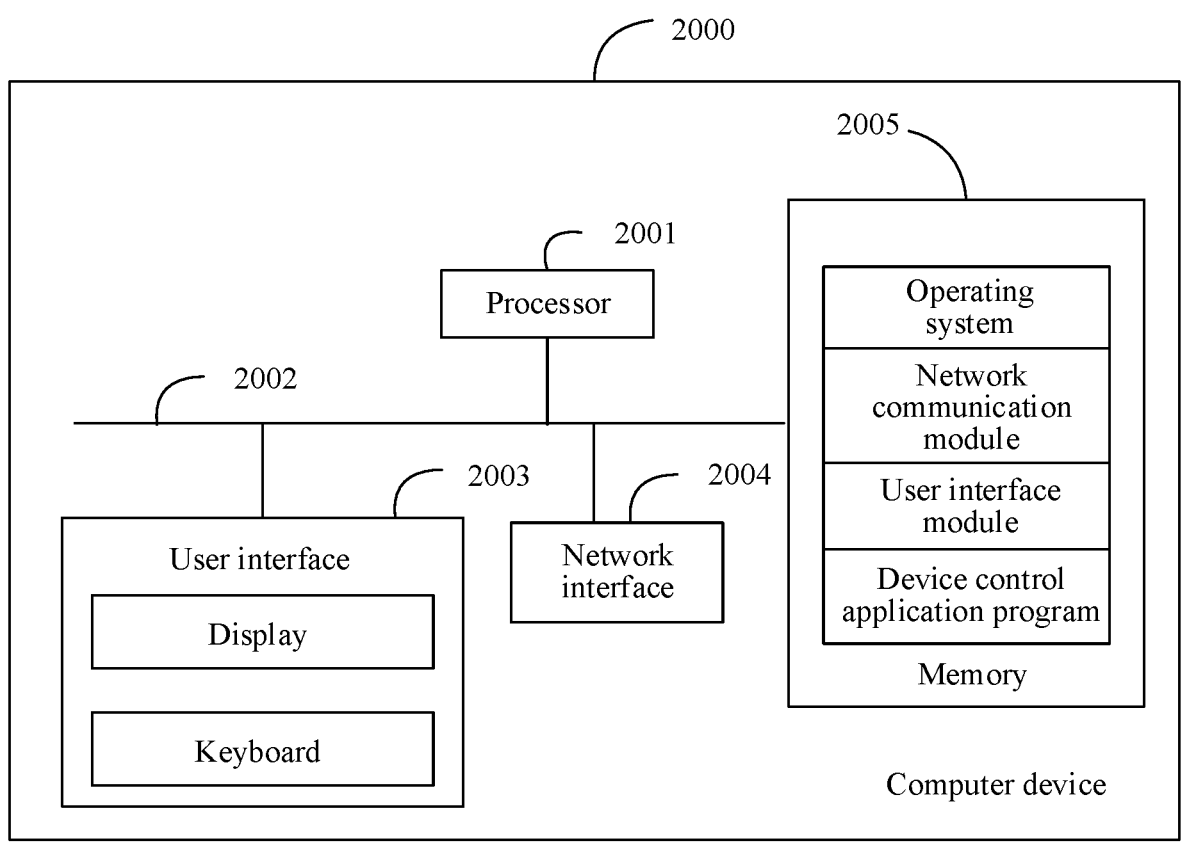
FIG. 11 is a schematic structural diagram of a computer device according to an embodiment of the present disclosure.

As an example, FIG. 11 is a schematic structural diagram of a computer device according to an embodiment of the present disclosure. Referring to FIG. 11, the data processing apparatus 2 in the embodiment corresponding to FIG. 10 may be applied to the computer device 2000. The computer device 2000 may include a processor 2001, a network interface 2004 and a memory 2005. In addition, the computer device 2000 may further include a user interface 2003 and at least one communication bus 2002. The communications bus 2002 is configured to implement connection and communication between the components. The user interface 2003 may include a display and a keyboard. In some embodiments, the user interface 2003 may further include a standard wired interface and a standard wireless interface. As an example, the network interface 2004 may include a standard wired interface and a standard wireless interface (such as WI-FI interface). The memory 2005 may be a high-speed RAM memory, or a non-volatile memory, for example, at least one magnetic disk memory. As an example, the memory 2005 may be at least one storage apparatus located away from the processor 2001. Referring to FIG. 11, the memory 2005 used as a computer-readable storage medium may include an operating system, a network communications module, a user interface module, and a device control application program.

In the computer device 2000 illustrated in FIG. 11, the network interface 2004 can provide a network communication function. The user interface 2003 is mainly configured to provide an input interface for the user. The processor 2001 may be configured to call the device control application program stored in the memory 2005 to implement the following processing: acquiring transaction data for validation, and performing validation processing on the transaction data for validation to obtain a validation processing result of the transaction data for validation; when the validation processing result of the transaction data for validation is a validated-as-valid result, adding the transaction data for validation to a transaction pool; when a transaction packing request transmitted by a block processing node is received, acquiring at least one transaction data from the transaction pool according to the transaction packing request, hardware device resources of the transaction processing node and the block processing node being independent from each other; performing packing processing on the at least one transaction data to obtain a transaction data packet, and transmitting the transaction data packet to the block processing node, so that the block processing node generates a proposed block according to the at least one transaction data in the transaction data packet.

It is to be understood that the computer device 2000 described in the embodiment of the present disclosure can execute the description of the data processing method in each of the above embodiments, and can also execute the description of the data processing apparatus 2 in the embodiment corresponding to FIG. 10 above, which will not be repeated here. In addition, the description of beneficial effects of the same method will not be described herein again.

An embodiment of the present disclosure further provides a computer-readable storage medium in which the computer program executed by the data processing apparatus 2 mentioned above is stored. When the processor loads and executes the computer program, it can execute the description of the data processing method in any one of the embodiments above, which will not be repeated here. In addition, the description of beneficial effects of the same method will not be described herein again. Technical details that are not disclosed in the computer-readable storage medium embodiment of the present disclosure may refer to the descriptions of the method embodiments of the present disclosure.

Figure 12:
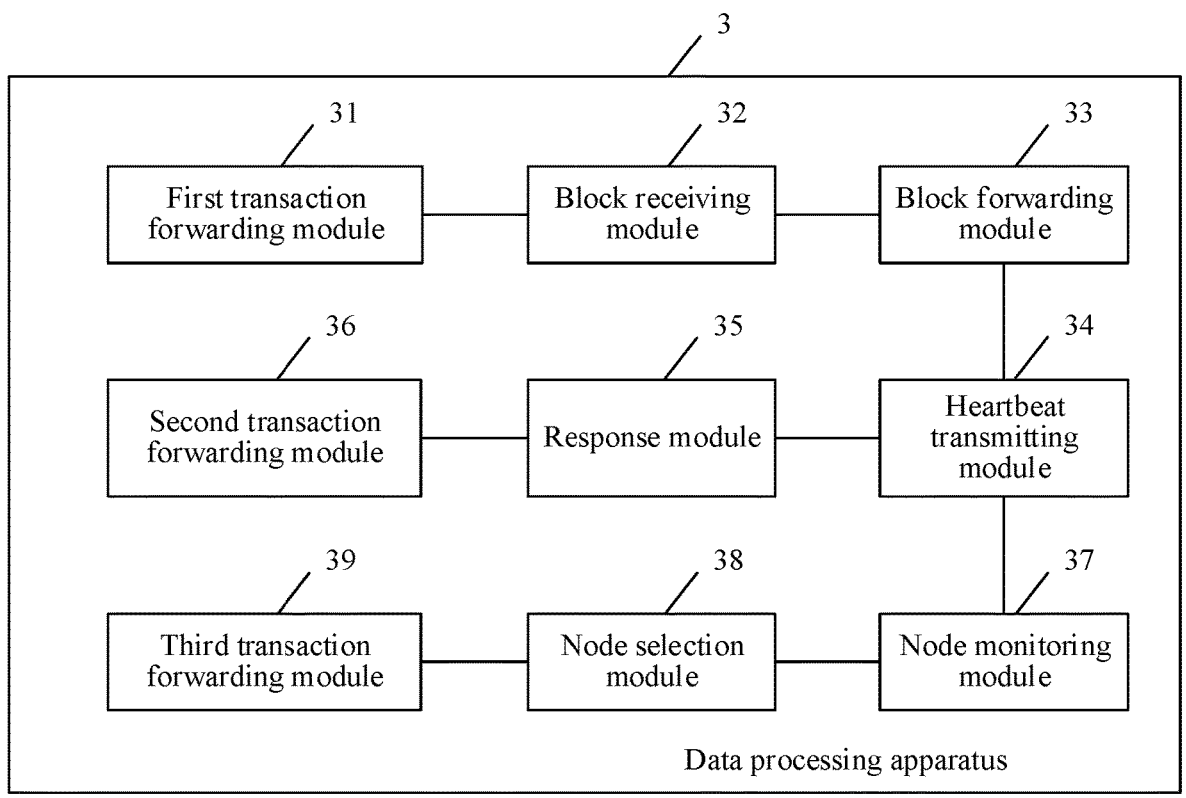
FIG. 12 is a schematic structural diagram of a block-chain-based data processing apparatus according to an embodiment of the present disclosure.

FIG. 12 is a schematic structural diagram of a block-chain-based data processing apparatus according to an embodiment of the present disclosure. The data processing apparatus may be a computer program (including program code) running in a computer device. For example, the data processing apparatus may be application software. The data processing apparatus can be used for executing the corresponding steps in the block-chain-based data processing method according to the embodiment of the present disclosure. Referring to FIG. 12, the data processing apparatus 3 may include a first transaction forwarding module 31, a block receiving module 32 and a block forwarding module 33.

The first transaction forwarding module 31 is configured to receive transaction data for validation transmitted by a terminal device, and forward the transaction data for validation to a transaction processing node, so that the transaction processing node adds the transaction data for validation validated as valid to a transaction pool.

The block receiving module 32 is configured to receive block signature data and a proposed block forwarded by a block processing node. The block signature data is obtained by the block processing node signing the proposed block. The proposed block is generated by the block processing node according to at least one transaction data from the transaction pool transmitted by the transaction processing node.

The block forwarding module 33 is configured to acquire a communication address of a communicable block chain gateway node, and forward the block signature data and the proposed block to the communicable block chain gateway node based on the communication address, so that the communicable block chain gateway node forwards the proposed block to a communicable block processing node. The communicable block processing node is configured to perform consensus voting on the proposed block based on the block signature data.

Exemplary implementations of the first transaction forwarding module 31, the block receiving module 32 and the block forwarding module 33 may also refer to the specific description in FIG. 5, which will not be repeated here.

Referring to FIG. 10, the data processing apparatus 3 may further include a heartbeat transmission module 34, a response module 35 and a second transaction forwarding module 36.

The heartbeat transmission module 34 is configured to transmit a heartbeat message to the transaction processing node, so that the transaction processing node generates a response message based on the heartbeat message.

The response module 35 is configured to, when the response message of the transaction processing node is not received within a target time period, determine that the transaction processing node is a fault transaction processing node, and select a first standby transaction processing node.

The second transaction forwarding module 36 is configured to, when new transaction data for validation transmitted by the terminal device is received, transmit the new transaction data for validation to the first standby transaction processing node.

Exemplary implementations of the heartbeat transmitting module 34, the response module 35 and the second transaction forwarding module 36 may also refer to the specific description in FIG. 5, which will not be repeated here.

Referring to FIG. 10, the data processing apparatus 3 may further include a node monitoring module 37, a node selection module 38 and a third transaction forwarding module 39.

The node monitoring module 37 is configured to monitor a load situation of the transaction processing node.

The node selection module 38 is configured to, when the load situation of the transaction processing node is an overload situation, select a second standby transaction processing node.

The third transaction forwarding module 39 is configured to, when first transaction data for validation and second transaction data for validation transmitted by the terminal device are received, transmit the first transaction data for validation to the transaction processing node, so that the transaction processing node adds the first transaction data for validation to the transaction pool.

The third transaction forwarding module 39 is further configured to transmit the second transaction data for validation to the second standby transaction processing node, so that the second standby transaction processing node adds the second transaction data for validation to a standby transaction pool.

Exemplary implementations of the node monitoring module 37, the node selection module 38 and the third transaction forwarding module 39 may also refer to the specific description in FIG. 5, which will not be repeated here.

Figure 13:
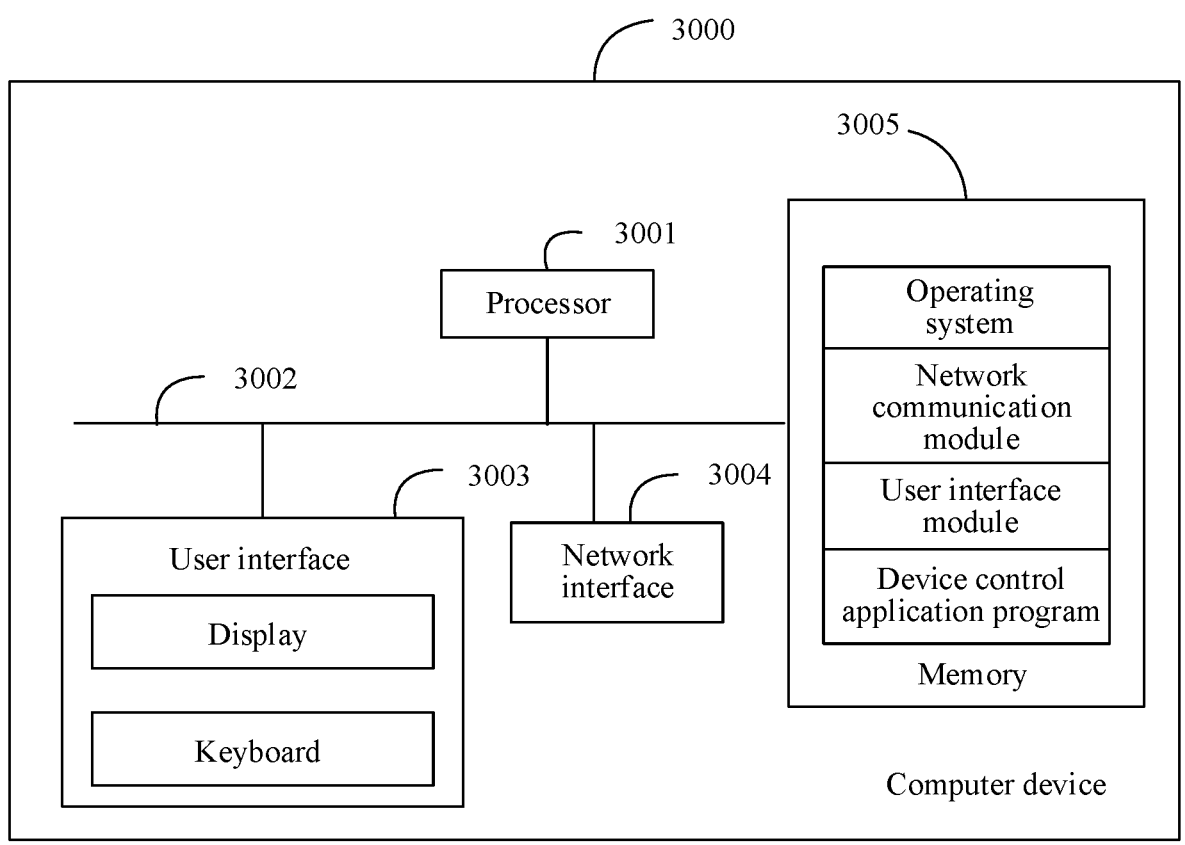
FIG. 13 is a schematic structural diagram of a computer device according to an embodiment of the present disclosure.

FIG. 13 is a schematic structural diagram of another computer device according to an embodiment of the present disclosure. Referring to FIG. 13, the data processing apparatus 3 in the embodiment corresponding to FIG. 12 may be applied to the computer device 3000. The computer device 3000 may include a processor 3001, a network interface 3004 and a memory 3005. In addition, the computer device 3000 may further include a user interface 3003 and at least one communication bus 3002. The communications bus 3002 is configured to implement connection and communication between the components. The user interface 3003 may include a display and a keyboard. In some embodiments, the user interface 3003 may further include a standard wired interface and a standard wireless interface. As an example, the network interface 3004 may include a standard wired interface and a standard wireless interface (such as WI-FI interface). The memory 3005 may be a high-speed RAM memory, or a non-volatile memory, for example, at least one magnetic disk memory. As an example, the memory 3005 may be at least one storage apparatus located away from the processor 3001. Referring to FIG. 13, the memory 3005 used as a computer-readable storage medium may include an operating system, a network communications module, a user interface module, and a device control application program.

In the computer device 3000 illustrated in FIG. 13, the network interface 3004 can provide a network communication function. The user interface 3003 is mainly configured to provide an input interface for the user. The processor 3001 may be configured to call the device control application program stored in the memory 3005 to implement the following processing: receiving transaction data for validation transmitted by a terminal device, and forwarding the transaction data for validation to a transaction processing node, so that the transaction processing node adds the transaction data for validation validated as valid to a transaction pool; receiving block signature data and a proposed block forwarded by the block processing node, the block signature data being obtained by the block processing node signing the proposed block, the proposed block being generated by the block processing node according to at least one transaction data from the transaction pool transmitted by the transaction processing node; and acquiring a communication address of a communicable block chain gateway node, and forwarding the block signature data and the proposed block to the communicable block chain gateway node based on the communication address, so that the communicable block chain gateway node forwards the proposed block to a communicable block processing node, the communicable block processing node being used for performing consensus voting on the proposed block based on the block signature data.

It is to be understood that the computer device 2000 described in the embodiment of the present disclosure can execute the description of the data processing method in each of the above embodiments, and can also execute the description of the data processing apparatus 3 in the embodiment corresponding to FIG. 10 above, which will not be repeated here. In addition, the description of beneficial effects of the same method will not be described herein again.

An embodiment of the present disclosure further provides a computer-readable storage medium in which the computer program executed by the data processing apparatus 3 mentioned above is stored. When the processor loads and executes the computer program, it can execute the description of the access control method in any one of the embodiments above, which will not be repeated here. In addition, the description of beneficial effects of the same method will not be described herein again. Technical details that are not disclosed in the computer-readable storage medium embodiment of the present disclosure may refer to the descriptions of the method embodiments of the present disclosure.

The computer-readable storage medium may be the data processing apparatus according to any one of the embodiments or an internal storage unit of the computer device, such as a hard disk or an internal memory of the computer device. The computer-readable storage medium may also be an external storage device of the computer device, such as a plug-in hard disk, a Smart Media Card (SMC), a Secure Digital (SD) card or a flash card equipped on the computer device. As an example, the computer-readable storage medium may also include both the internal storage unit and the external storage device of the computer device. The computer-readable storage medium is used for storing the computer program and other programs and data required by the computer device. The computer-readable storage medium may also be used for temporarily storing data that have been output or will be output.

An embodiment of the present disclosure further provides a computer program product or a computer program. The computer program product or the computer program includes computer instructions. The computer instructions are stored in a computer-readable storage medium. The processor of the computer device reads the computer instructions from the computer-readable storage medium and the processor executes the computer instructions to enable the computer device to execute the block-chain-based data processing method according to any one of the embodiments above.

Terms such as "first" and "second" in the description, claims and accompanying drawings of the present disclosure are used for distinguishing different objects, instead of describing a specific order. In addition, the terms "include" and any variant thereof are intended to cover a non-exclusive inclusion. For example, a process, method, apparatus, product, or device that includes a series of steps or units is not limited to the listed steps or units; and instead, further In some embodiments includes a step or unit that is not listed, or further In some embodiments includes another step or unit that is intrinsic to the process, method, apparatus, product, or device.

Further, the term unit (and other similar terms such as module, subunit, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

What are disclosed above are merely exemplary embodiments of the present disclosure, and certainly are not intended to limit the scope of the claims of the present disclosure. Therefore, equivalent variations made in accordance with the claims of the present disclosure shall still fall within the scope of the present disclosure.

What is claimed is:

1. A block-chain-based data processing method executed by a transaction processing node that comprises at least one computer device, the method comprising:
   acquiring, by the transaction processing node, transaction data for validation, and performing validation processing on the transaction data for validation to obtain a validation processing result of the transaction data for validation;

in response to the validation processing result of the transaction data for validation being a validated-as-valid result, adding the transaction data for validation to a transaction pool;

in response to a transaction packing request transmitted by a block processing node being received, acquiring at least one transaction data from the transaction pool according to the transaction packing request, hardware device resources of the transaction processing node and the block processing node being independent from each other, the transaction processing node being configured to perform transaction validation and transaction broadcasting, the block processing node being configured to perform block packing, block consensus, transaction execution, and storage-in-ledger; and performing packing processing on the at least one transaction data to obtain a transaction data packet, and transmitting the transaction data packet to the block processing node for the block processing node to generate a proposed block according to the at least one transaction data in the transaction data packet and perform consensus processing on the proposed block to determine a consensus processing result for the proposed bock, the consensus processing result being determined based on a first block validation result and a second block validation result, the second block validation result being obtained based on the block processing node performing block validation processing on the proposed block, the first block validation result being obtained based on at least one other block processing node of a block chain node cluster performing the block validation processing on the proposed block.

2. The method according to claim 1, wherein acquiring, by the transaction processing node, the transaction data for validation, and performing the validation processing on the transaction data for validation to obtain the validation processing result of the transaction data for validation comprise:

receiving, by the transaction processing node, the transaction data for validation transmitted by a third block chain gateway node, wherein the third block chain gateway node is configured to forward the transaction data for validation to the transaction processing node in response to the transaction data for validation transmitted by a terminal device being received;

receiving transaction signature data associated with the transaction data for validation transmitted by the third block chain gateway node, wherein the transaction signature data is signature data obtained by the terminal device signing the transaction data for validation through a private key of a transaction initiating object;

acquiring the public key of the transaction initiating object and performing signature validation processing on the transaction signature data through the public key to obtain a signature validation result;

in response to the signature validation result being a signature validation pass result, performing duplicate validation processing on the transaction data for validation to obtain a duplicate validation processing result; and in response to the duplicate validation processing result being a duplicate validation pass result, determining that a validation processing result of the transaction data for validation is a validated-as-valid result.

3. The method according to claim 2, wherein performing the duplicate validation processing on the transaction data for validation to obtain the duplicate validation processing result comprises:

searching the transaction data for validation in a block chain ledger;

in response to the transaction data for validation being found in the block chain ledger, determining that the duplicate validation processing result is a duplicate validation fail result; and in response to the transaction data for validation being not found in the block chain ledger, determining that the duplicate validation processing result is a duplicate validation pass result.

4. The method according to claim 1, further comprising:

receiving a transaction completion notification instruction transmitted by the block processing node, wherein the transaction completion notification instruction is generated when the block processing node writes the proposed block and the transaction execution result into the block chain ledger; and the transaction execution result is a transaction execution result corresponding to the at least one transaction data obtained by executing the proposed block, and the proposed block is executed by the block processing node when a consensus on the proposed block passes; and deleting the at least one transaction data in the transaction pool according to the transaction completion notification instruction and adding the at least one transaction data to a chained transaction buffer pool.

5. The method according to claim 4, further comprising:

receiving a transaction query request for target transaction data generated by a terminal device, and searching the target transaction data in the chained transaction buffer pool according to the transaction query request;

in response to the target transaction data being found in the chained transaction buffer pool, transmitting a transaction completion result to the terminal device;

in response to the target transaction data being not found in the chained transaction buffer pool, searching the target transaction data in the block chain ledger;

in response to the target transaction data being found in the block chain ledger, adding the target transaction data to the chained transaction buffer pool and transmitting a transaction completion result to the terminal device; and in response to the target transaction data being not found in the block chain ledger, transmitting a transaction incompletion result to the terminal device.

6. The method according to claim 1, further comprising:

receiving a block query instruction transmitted by the block processing node, wherein the block query instruction is generated when the block processing node generates the proposed block;

performing block query processing on the proposed block according to the block query instruction to obtain the second block validation result; and transmitting the second block validation result to the block processing node for the block processing node to perform consensus voting on the proposed block according to the second block validation result.

7. The method according to claim 6, wherein the second block validation result comprises a validation pass result or a validation fail result; the validation pass result is used for instructing the block processing node to generate a consensus pass vote for the proposed block; the validation fail result is used for instructing the block processing node to generate a consensus fail vote for the proposed block; the proposed block comprises transaction data M, and the transaction data M comes from the at least one transaction data; and performing the block query processing on the proposed block according to the block query instruction to obtain the second block validation result comprises:

searching the transaction data M in the transaction pool according to the block query instruction;

in response to the transaction data M being found in the transaction pool, determining that the transaction data M is valid transaction data;

in response to the transaction data M being not found in the transaction pool, performing signature validation processing and duplicate validation processing on the transaction data M to obtain a signature validation result of the transaction data M and a duplicate validation processing result of the transaction data M;

in response to the signature validation result of the transaction data M and the duplicate validation processing result of the transaction data M being validated-as-valid results, determining that the transaction data M is valid transaction data;

in response to the signature validation result of the transaction data M or the duplicate validation processing result of the transaction data M being not the validated-as-valid result, determining that the transaction data M is invalid transaction data;

in response to each transaction data in the proposed block being valid transaction data, determining that the block query result of the proposed block is a validation pass result; and in response to at least one invalid transaction data existing in the proposed block, determining that the block query result of the proposed block is a validation fail result.

8. The method according to claim 1, wherein the transaction data for validation comprises N transaction data for validation, and N is a positive integer; and the method further comprises:

selecting L transaction data for validation from the N transaction data for validation added to the transaction pool to perform transaction packing processing to obtain a broadcast transaction packet, wherein L is a positive integer, and the total data capacity of the L transaction data for validation is less than a configurable capacity threshold; and transmitting the broadcast transaction packet to a fourth block chain gateway node, so that the fourth block chain gateway node acquires a communication address of a fifth block chain gateway node and forwards the broadcast transaction packet to the fifth block chain gateway node based on the communication address, wherein the fifth block chain gateway node is configured to forward the broadcast transaction packet to a communicable transaction processing node; and the communicable transaction processing node is configured to decompress the broadcast transaction packet into the L transaction data for validation, and add the L transaction data for validation to the transaction pool to which the communicable transaction processing node belongs when the L transaction data for validation is validated as valid.

9. A computer device, in a transaction processing node, comprising: a processor, a memory and a network interface, the processor being connected to the memory and the network interface, the network interface being configured to provide a data communication function, the memory being configured to store a program code, and the processor being configured to call the program code to execute a block-chain-based data processing method, the method comprising:

acquiring transaction data for validation, and performing validation processing on the transaction data for validation to obtain a validation processing result of the transaction data for validation;

in response to the validation processing result of the transaction data for validation being a validated-as-valid result, adding the transaction data for validation to a transaction pool;

in response to a transaction packing request transmitted by a block processing node being received, acquiring at least one transaction data from the transaction pool according to the transaction packing request, hardware device resources of the transaction processing node and the block processing node being independent from each other, the transaction processing node being configured to perform transaction validation and transaction broadcasting, the block processing node being configured to perform block packing, block consensus, transaction execution, and storage-in-ledger; and performing packing processing on the at least one transaction data to obtain a transaction data packet, and transmitting the transaction data packet to the block processing node for the block processing node to generate a proposed block according to the at least one transaction data in the transaction data packet and perform consensus processing on the proposed block to determine a consensus processing result for the proposed bock, the consensus processing result being determined based on a first block validation result and a second block validation result, the second block validation result being obtained based on the block processing node performing block validation processing on the proposed block, the first block validation result being obtained based on at least one other block processing node of a block chain node cluster performing the block validation processing on the proposed block.

10. The device according to claim 9, wherein acquiring the transaction data for validation, and performing the validation processing on the transaction data for validation to obtain the validation processing result of the transaction data for validation comprise:

receiving the transaction data for validation transmitted by a third block chain gateway node, wherein the third block chain gateway node is configured to forward the transaction data for validation to the transaction processing node in response to the transaction data for validation transmitted by a terminal device being received;

receiving transaction signature data associated with the transaction data for validation transmitted by the third block chain gateway node, wherein the transaction signature data is signature data obtained by the terminal device signing the transaction data for validation through a private key of a transaction initiating object;

acquiring the public key of the transaction initiating object and performing signature validation processing on the transaction signature data through the public key to obtain a signature validation result;

in response to the signature validation result being a signature validation pass result, performing duplicate validation processing on the transaction data for validation to obtain a duplicate validation processing result; and in response to the duplicate validation processing result being a duplicate validation pass result, determining that a validation processing result of the transaction data for validation is a validated-as-valid result.

11. The device according to claim 10, wherein performing the duplicate validation processing on the transaction data for validation to obtain the duplicate validation processing result comprises:

searching the transaction data for validation in a block chain ledger;

in response to the transaction data for validation being found in the block chain ledger, determining that the duplicate validation processing result is a duplicate validation fail result; and in response to the transaction data for validation being not found in the block chain ledger, determining that the duplicate validation processing result is a duplicate validation pass result.

12. The device according to claim 9, the method further comprising:

receiving a transaction completion notification instruction transmitted by the block processing node, wherein the transaction completion notification instruction is generated when the block processing node writes the proposed block and the transaction execution result into the block chain ledger; and the transaction execution result is a transaction execution result corresponding to the at least one transaction data obtained by executing the proposed block, and the proposed block is executed by the block processing node when a consensus on the proposed block passes; and deleting the at least one transaction data in the transaction pool according to the transaction completion notification instruction and adding the at least one transaction data to a chained transaction buffer pool.

13. The device according to claim 12, the method further comprising:

receiving a transaction query request for target transaction data generated by a terminal device, and searching the target transaction data in the chained transaction buffer pool according to the transaction query request;

in response to the target transaction data being found in the chained transaction buffer pool, transmitting a transaction completion result to the terminal device;

in response to the target transaction data being not found in the chained transaction buffer pool, searching the target transaction data in the block chain ledger;

in response to the target transaction data being found in the block chain ledger, adding the target transaction data to the chained transaction buffer pool and transmitting a transaction completion result to the terminal device; and in response to the target transaction data being not found in the block chain ledger, transmitting a transaction incompletion result to the terminal device.

14. The device according to claim 9, the method further comprising:

receiving a block query instruction transmitted by the block processing node, wherein the block query instruction is generated when the block processing node generates the proposed block;

performing block query processing on the proposed block according to the block query instruction to obtain the second block validation result; and transmitting the block validation result to the block processing node for the block processing node to perform consensus voting on the proposed block according to the second block validation result.

15. The device according to claim 14, wherein the second block validation result comprises a validation pass result or a validation fail result; the validation pass result is used for instructing the block processing node to generate a consensus pass vote for the proposed block; the validation fail result is used for instructing the block processing node to generate a consensus fail vote for the proposed block; the proposed block comprises transaction data M, and the transaction data M comes from the at least one transaction data; and performing the block query processing on the proposed block according to the block query instruction to obtain the second block validation result comprises:

searching the transaction data M in the transaction pool according to the block query instruction;

in response to the transaction data M being found in the transaction pool, determining that the transaction data M is valid transaction data;

in response to the transaction data M being not found in the transaction pool, performing signature validation processing and duplicate validation processing on the transaction data M to obtain a signature validation result of the transaction data M and a duplicate validation processing result of the transaction data M;

in response to the signature validation result of the transaction data M and the duplicate validation processing result of the transaction data M being validated-as-valid results, determining that the transaction data M is valid transaction data;

in response to the signature validation result of the transaction data M or the duplicate validation processing result of the transaction data M being not the validated-as-valid result, determining that the transaction data M is invalid transaction data;

in response to each transaction data in the proposed block being valid transaction data, determining that the block query result of the proposed block is a validation pass result; and in response to at least one invalid transaction data existing in the proposed block, determining that the block query result of the proposed block is a validation fail result.

16. The device according to claim 9, wherein the transaction data for validation comprises N transaction data for validation, and N is a positive integer; and the method further comprises:

selecting L transaction data for validation from the N transaction data for validation added to the transaction pool to perform transaction packing processing to obtain a broadcast transaction packet, wherein L is a positive integer, and the total data capacity of the L transaction data for validation is less than a configurable capacity threshold; and transmitting the broadcast transaction packet to a fourth block chain gateway node, so that the fourth block chain gateway node acquires a communication address of a fifth block chain gateway node and forwards the broadcast transaction packet to the fifth block chain gateway node based on the communication address, wherein the fifth block chain gateway node is configured to forward the broadcast transaction packet to a communicable transaction processing node; and the communicable transaction processing node is configured to decompress the broadcast transaction packet into the L transaction data for validation, and add the L transaction data for validation to the transaction pool to which the communicable transaction processing node belongs when the L transaction data for validation is validated as valid.

17. A non-transitory computer-readable storage medium storing a computer program, the computer program being adapted to be loaded and executed by a processor of a transaction processing node to execute a block-chain-based data processing method, the method comprising:

acquiring transaction data for validation, and performing validation processing on the transaction data for validation to obtain a validation processing result of the transaction data for validation;

in response to the validation processing result of the transaction data for validation being a validated-as-valid result, adding the transaction data for validation to a transaction pool;

in response to a transaction packing request transmitted by a block processing node being received, acquiring at least one transaction data from the transaction pool according to the transaction packing request, hardware device resources of the transaction processing node and the block processing node being independent from each other, the transaction processing node being configured to perform transaction validation and transaction broadcasting, the block processing node being configured to perform block packing, block consensus, transaction execution, and storage-in-ledger; and performing packing processing on the at least one transaction data to obtain a transaction data packet, and transmitting the transaction data packet to the block processing node for the block processing node to generate a proposed block according to the at least one transaction data in the transaction data packet and perform consensus processing on the proposed block to determine a consensus processing result for the proposed bock, the consensus processing result being determined based on a first block validation result and a second block validation result, the second block validation result being obtained based on the block processing node performing block validation processing on the proposed block, the first block validation result being obtained based on at least one other block processing node of a block chain node cluster performing the block validation processing on the proposed block.

18. The storage medium according to claim 17, wherein acquiring the transaction data for validation, and performing the validation processing on the transaction data for validation to obtain the validation processing result of the transaction data for validation comprise:

receiving the transaction data for validation transmitted by a third block chain gateway node, wherein the third block chain gateway node is configured to forward the transaction data for validation to the transaction processing node in response to the transaction data for validation transmitted by a terminal device being received;

receiving transaction signature data associated with the transaction data for validation transmitted by the third block chain gateway node, wherein the transaction signature data is signature data obtained by the terminal device signing the transaction data for validation through a private key of a transaction initiating object;

acquiring the public key of the transaction initiating object and performing signature validation processing on the transaction signature data through the public key to obtain a signature validation result;

in response to the signature validation result being a signature validation pass result, performing duplicate validation processing on the transaction data for validation to obtain a duplicate validation processing result; and in response to the duplicate validation processing result being a duplicate validation pass result, determining that a validation processing result of the transaction data for validation is a validated-as-valid result.

19. The storage medium according to claim 18, wherein performing the duplicate validation processing on the transaction data for validation to obtain the duplicate validation processing result comprises:

searching the transaction data for validation in a block chain ledger;

in response to the transaction data for validation being found in the block chain ledger, determining that the duplicate validation processing result is a duplicate validation fail result; and in response to the transaction data for validation being not found in the block chain ledger, determining that the duplicate validation processing result is a duplicate validation pass result.

20. The storage medium according to claim 17, the method further comprising:

receiving a transaction completion notification instruction transmitted by the block processing node, wherein the transaction completion notification instruction is generated when the block processing node writes the proposed block and the transaction execution result into the block chain ledger; and the transaction execution result is a transaction execution result corresponding to the at least one transaction data obtained by executing the proposed block, and the proposed block is executed by the block processing node when a consensus on the proposed block passes; and deleting the at least one transaction data in the transaction pool according to the transaction completion notification instruction and adding the at least one transaction data to a chained transaction buffer pool.

\* \* \* \* \*